United States Patent
Taniwaki

(10) Patent No.: US 6,310,681 B1
(45) Date of Patent: Oct. 30, 2001

(54) METHOD AND APPARATUS FOR IMAGE FORMING

(75) Inventor: Michio Taniwaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/227,813

(22) Filed: Jan. 11, 1999

(30) Foreign Application Priority Data

Jan. 13, 1998 (JP) .................................................. 10-005053

(51) Int. Cl.$^7$ ............................. G03B 27/52; B41J 2/435
(52) U.S. Cl. .............................................. 355/55; 347/250
(58) Field of Search ............................... 355/55; 347/118, 347/250, 261; 358/523; 364/174, 519

(56) References Cited

U.S. PATENT DOCUMENTS

| 4,807,156 | * | 2/1989 | Parisi | ..................................... | 364/519 |
| 6,157,400 | * | 12/2000 | Genovese | ............................... | 347/250 |

FOREIGN PATENT DOCUMENTS

| 55-53779 | 4/1980 | (JP) . |
| 62-39975 | 2/1987 | (JP) . |
| 2-291573 | 12/1990 | (JP) . |
| 6-118735 | 4/1994 | (JP) . |
| 6-242386 | 9/1994 | (JP) . |
| 7-72698 | 3/1995 | (JP) . |

* cited by examiner

Primary Examiner—Russell Adams
Assistant Examiner—Peter B. Kim
(74) Attorney, Agent, or Firm—Oliff & Berridge, PLC

(57) ABSTRACT

Magnification data for designating a recording magnification of an overall image along a horizontal scanning direction, magnification balance data for designating the balance in the recording magnification of left and right partial image regions, and write position data for designating the timing of starting the recording of an image are inputted on the basis of results of measurement of the positions of registration marks formed at the center and both ends of an image recording range. A phase selection circuit and a LSYNC generating circuit adjust the timing of starting the recording of an image on the basis of the write position data. A detecting circuit detects an average frequency of a pixel clock and a frequency difference of partial image regions during one scanning by a laser beam, and an average-frequency control circuit and a left-right frequency difference control circuit effect control on the basis of the detected frequencies such that during one scanning by the laser beam the pixel clock frequency (oscillation frequency of VCO) changes with a scope of change corresponding to the magnification balance data by using as a reference a frequency corresponding to the magnification data.

14 Claims, 11 Drawing Sheets

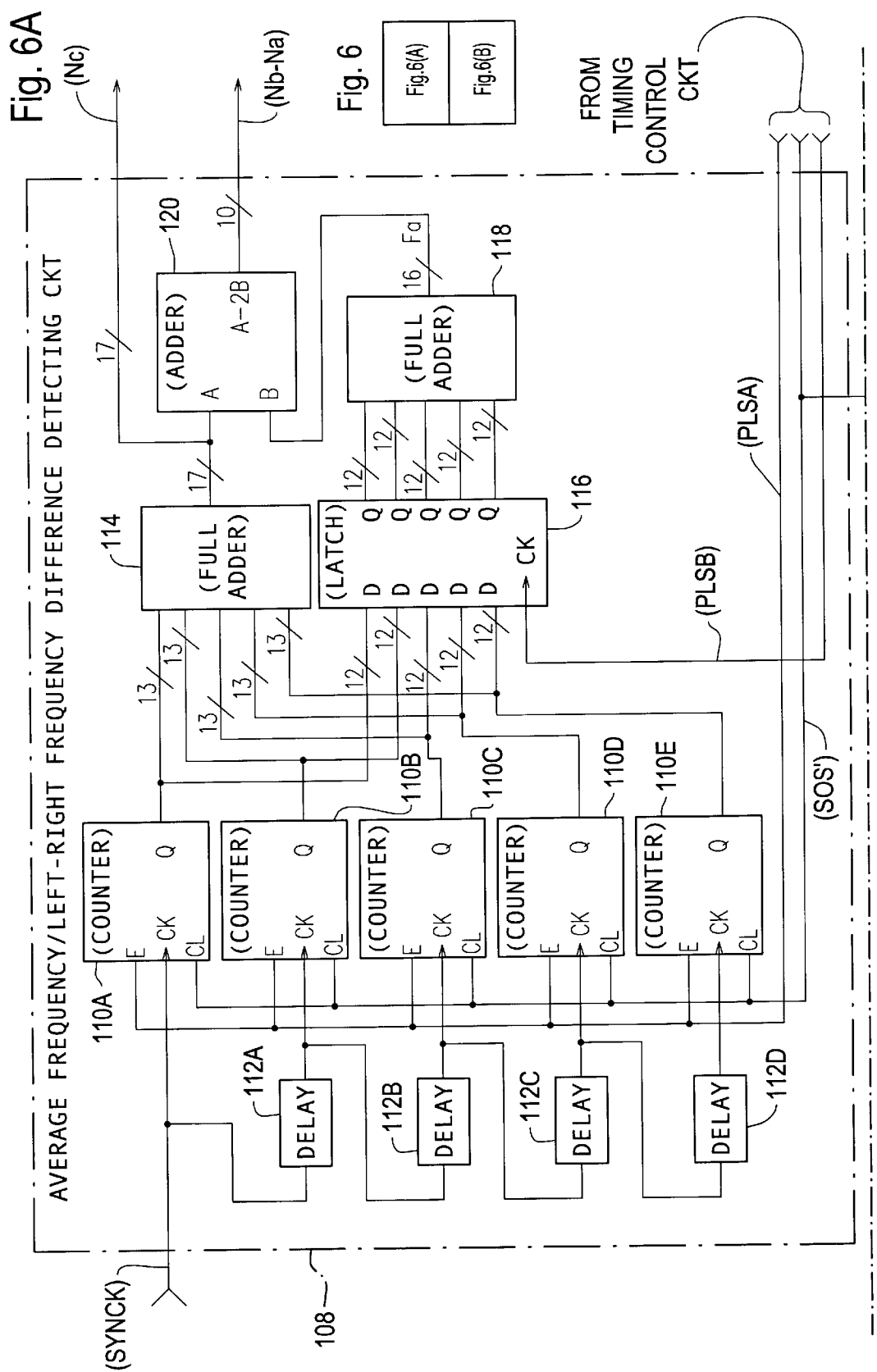

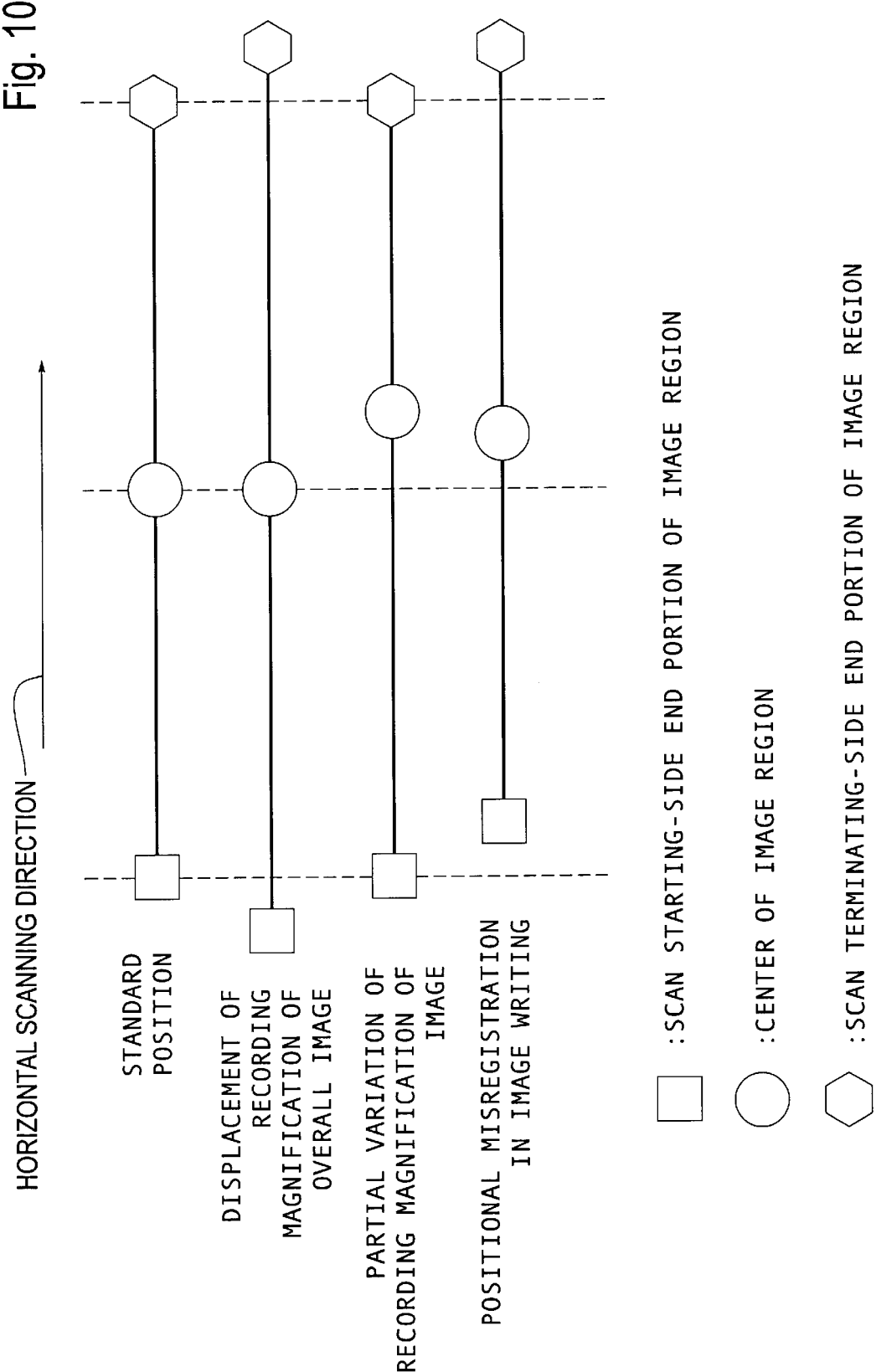

METHOD AND APPARATUS FOR IMAGE FORMING

BACKGROUND OF THE INVENTION

The present invention relates to an image forming apparatus, and more particularly to an image forming apparatus for forming an image on an object to be illuminated by causing a light beam modulated in correspondence with an image to be formed to scan the object to be illuminated.

Conventionally, an image forming apparatus is known in which a light beam such as a laser beam emitted from an optical scanning device is caused to scan an image carrier (horizontal scanning) to form an electrostatic latent image on the image carrier, and a toner image obtained by developing the electrostatic latent image is transferred onto a recording material, thereby forming an image on the recording material. Also known is a color image forming apparatus which has a plurality of optical scanning devices and image carriers, electrostatic latent images are formed independently on the image carriers, respectively, to form toner images in respective colors (e.g., C, M, Y, and K), and the toner images in the respective colors are consecutively transferred onto and superposed on an identical recording material, thereby forming a color image on the recording material.

In this type of image forming apparatus, there are cases where the positions where toner images in the respective colors are formed on the image carriers and the positions where the toner images in the respective colors are transferred onto the recording material are misregistered in the horizontal scanning direction with respect to predetermined positions due to such factors as (1) tolerances of optical components which make up the optical scanning device and tolerances of mounting positions of the optical components, (2) tolerances of a frame on which the optical scanning device is mounted, and (3) changes in the surrounding environment such as the temperature and the state of installation or changes with the passage of time. This misregistration in the transfer position is visually recognized as a color misregistration in the formation of a color image, and resulted in an appreciable decline in the image quality.

It should be noted that, as shown in FIG. 10 in greater detail, the positional misregistration and color misregistration along the horizontal scanning direction are made up of three elements including (1) a displacement in the recording magnification of an overall image (a change in the length of an image region along the horizontal scanning direction), (2) a partial variation in the recording magnification of the image (a partial change in the length of the image region along the horizontal scanning direction; by way of example, the drawing shows a case in which the length of a partial region on the scan starting side with the center of an image region serving as a boundary is longer than a partial region on the scan terminating side), and (3) an misregistration in the writing position (a positional misregistration along the horizontal scanning direction in the image region).

In connection with the above description, it is described in the Unexamined Japanese Patent Application Publication No. Hei 2-291573 that, in order to improve registration in the horizontal scanning direction of a tandem engine, the displacement in the magnification is corrected by detecting the position of a registration mark of each color by a sensor and by changing a pixcel clock frequency for each color by means of a phase-locked loop (PLL), the displacement in the partial magnification is corrected by rotating or moving parallel an fθ lens by a driving means such as a piezoelectric element or the like, and the misregistration in the writing position is corrected by changing the image writing timing. However, if the fθ lens is rotated or moved parallel, there is a possibility that the focusing position of the laser beam deviates from a photoconductor and the sharpness of the image declines, and there is a problem, among others, that the cost of the driving means rises since it is necessary to precisely control the amount of movement of the fθ lens by its disposition.

In addition, it is described in the Unexamined Japanese Patent Application Publication No. Hei 6-242386 that, in order to correct the positional misregistration of dots due to an fθ error, a pixel clock is generated by separating a pixel clock frequency outputted from a source generator, and the separating ratio is changed by a programmable counter, thereby controlling the period of the pixcel clock for each dot. It should be noted that in the above-described publication, the separating ratio data is stored in a memory for each dot.

However, the above-described technology is difficult to be applied to a case such as where an image of a high resolution is formed at high speed. Namely, under the conditions where the recording density of the image is 600 spi (spi denotes the number of light spots per inch) and the process speed (the moving speed of the photoconductor) is approximately 260 mm/s, even if an attempt is made to expose and record two lines simultaneously by a dual LD, the pixel clock frequency needs to be set to a high frequency of 300 MHz or more. In addition, if an attempt is made to correct the color misregistration or positional misregistration with a high resolution, the separating ratio data needs to be stored for each step of the resolution, so that there is a problem in that memory of a huge memory capacity is required.

SUMMARY OF THE INVENTION

The present invention has been devised in view of the above-described facts, and its object is to obtain an image forming apparatus which is capable of correcting the misregistration of an image forming position without entailing the complication of the structure.

To attain the above object, an image forming apparatus in accordance with a first aspect of the invention stated in aspect 1 is characterized by being an image forming apparatus for forming an image on an object to be illuminated by causing the object to be illuminated to be scanned by a light beam modulated in correspondence with an image to be formed at a timing synchronized with a pixel clock, comprising: frequency controlling means in which a recording magnification of the overall image along a scanning direction of the light beam and a partial recording magnification of the image along the scanning direction are designated, and which, while the light beam is made to undergo one scanning, changes a pixel clock frequency with a scope of change corresponding to the designated partial recording magnification of the image by using as a reference a frequency corresponding to the designated recording magnification of the overall image; and modulation controlling means in which a position of starting the recording of the image along the scanning direction of the light beam is designated, and which controls the modulation of the light beam so that the recording of the image by the light beam is started from the designated recording starting position.

In the present invention, the recording magnification of the overall image along the scanning direction of the light beam and a partial recording magnification of the image along the scanning direction of the light beam are designated, and while the light beam is made to undergo one scanning, the frequency controlling means changes the pixel clock frequency with a scope of change corresponding to the designated partial recording magnification of the image by using as a reference a frequency corresponding to the designated recording magnification of the overall image. Since the light beam is modulated at a timing synchronized with the pixel clock and in correspondence with the image to be formed, as the pixel clock is changed as described above, the interval in the horizontal scanning direction between pixels making up the image changes in correspondence with the designation of the recording magnification of the overall image and the partial recording magnification of the image, thereby correcting the displacement of the recording magnification of the overall image and the partial variation in the recording magnification of the image.

As the pixel clock frequency is thus changed, since the displacement of the recording magnification of the overall image and the partial variation in the recording magnification of the image are corrected, it is unnecessary to rotate or move parallel an optical part such as an fθ lens so as to correct the partial variation in the recording magnification of the image, and it is possible to avoid the occurrence of such drawbacks as the structure becoming complicated and requiring precision control, and entailing high cost and the lowering of the sharpness of the image.

In addition, in the present invention, the frequency which serves as a reference in the change of the pixel clock frequency is determined in correspondence with the designated recording magnification of the overall image, and the scope of change in the change of the pixel clock frequency is determined in correspondence with the designated partial recording magnification of the image. The pixel clock frequency is changed in accordance with that frequency and the scope of change. Therefore, when the pixel clock frequency is controlled, it is unnecessary to store huge control data for controlling the pixel clock frequency for each dot, an it is possible to substantially curtail the memory capacity.

Then, in the present invention, since the position of starting the recording of the image along the scanning direction of the light beam is designated, and the modulation controlling means controls the modulation of the light beam so that the recording of the image by the light beam is started from the designated recording starting position, the misregistration in the position of starting the recording of the image is corrected, and the misregistration in the image forming position can be overcome in conjunction with the correction of the misregistration in the recording magnification of the overall image and the partial variation in the recording magnification of the image through the aforementioned change in the pixel clock frequency. Therefore, in accordance with the invention in aspect 1, it is possible to correct the misregistration of an image forming position without entailing the complication of the structure. In addition, in a case where the image forming apparatus in accordance with the present invention is an image forming apparatus for forming a color image by forming images in a plurality of mutually different colors and by superposing them, it is possible to overcome the aforementioned color misregistration of the color image by respectively correcting the image forming positions of images in the respective colors by the present invention.

Next, a description will be given of the other aspects of the invention.

A second aspect of the present invention is characterized by further comprising: first designating means for calculating and designating the position of starting the recording of the image in which an misregistration in the recording position of the image along the scanning direction of the laser beam is corrected; second designating means for calculating and designating the recording magnification of the overall image in which an misregistration in the length of an image region along the scanning direction is corrected; and third designating means for calculating and designating the partial recording magnification of the image in which a partial variation in the recording magnification of the image along the scanning direction is corrected.

In the first aspect of the invention described above, as for the position of starting the recording of the image along the scanning direction of the laser beam, the recording magnification of the overall image along the scanning direction, and the partial recording magnification of the image along the scanning direction, an aspect is possible in which, for example, these items are manually designated by an operator by performing operations such as measurement and calculation. In accordance with the second aspect of the invention, however, the position of starting the recording of the image in which the misregistration in the recording position of the image along the scanning direction of the laser beam is corrected is calculated and designated by the first designating means; the recording magnification of the overall image in which the misregistration in the length of an image region along the scanning direction is corrected is calculated and designated by the second designating means; and the partial recording magnification of the image in which the partial variation in the recording magnification of the image along the scanning direction is corrected is calculated and designated by the third designating means. Therefore, when correcting the misregistration in the image forming position, it becomes unnecessary for the operator to perform operations such as the calculation of the position of starting the recording of the image, the recording magnification of the overall image, and the partial recording magnification of the image, and it is possible to realize labor saving in operation.

A third aspect of the invention is characterized by further comprising: mark-formation controlling means for forming marks at more than three mutually different positions along the scanning direction of the laser beam; and mark detecting means for detecting the positions of the more than three marks formed by the mark-formation controlling means, wherein the first designating means, the second designating means, and the third designating means respectively calculate and designate the position of starting the recording of the image, the recording magnification of the overall image, and the partial recording magnification of the image on the basis of the positions of the more than three marks detected by the mark detecting means.

In the above-described second aspect of the invention, to calculate the position of starting the recording of the image, the recording magnification of the overall image, and the partial recording magnification of the image, it is necessary to determine the misregistration in the recording position of the image along the scanning direction of the laser beam, the misregistration in the length of the image region along the scanning direction, and the partial variation in the recording magnification of the image along the scanning direction. Although it is possible to provide an arrangement whereby the operator measures these items on the basis of the image formed by the image forming apparatus and inputs the results of measurement, the operation is complex, and there is a possibility that accurate values cannot be obtained.

In contrast, in the third aspect of the invention, marks are formed at more than three mutually different positions along the scanning direction of the laser beam by the mark-formation controlling means, the positions of the more than three marks thus formed are respectively detected by the mark detecting means, and the first designating means, the second designating means, and the third designating means respectively calculate the position of starting the recording of the image, the recording magnification of the overall image, and the partial recording magnification of the image on the basis of the positions of the more than three marks detected by the mark detecting means. Therefore, it is possible to accurately determine the misregistration in the recording position of the image, the misregistration in the length of the image region, and the partial variation in the recording magnification of the image, and it is possible to calculate the position of starting the recording of the image, the recording magnification of the overall image, and the partial recording magnification of the image such that they are corrected with high precision.

A fourth aspect of the invention is characterized in that an average pixel clock frequency during a period when the light beam scans the image region is designated as the recording magnification of the overall image along the scanning direction of the laser beam.

In the above-described first and second aspects of the invention, the recording magnification of the overall image along the scanning direction of the light beam may be designated by using the length of the image region which changes in correspondence with the recording magnification or by using the recording magnification itself, but it is preferred that the average pixel clock frequency during the period when the light beam scans the image region be designated as the recording magnification of the overall image, as in the fourth aspect of the invention. The average pixel clock frequency can be easily detected by counting the number of pulses, and by providing control such that the detected average frequency agrees with a designated average frequency, the recording magnification of the overall image can be made to agree with the recording magnification corresponding to the designated average frequency. Therefore, control is facilitated, and the configuration of the frequency controlling means can be simplified.

A fifth aspect of the invention is characterized in that a balance of the recording magnification in each partial image region at a time when the image region is divided into a pair of partial image regions at a center of the image region along the scanning direction of the laser beam is designated as the partial recording magnification of the image along the scanning direction of the laser beam.

In the above-described first and second aspects of the invention, the partial recording magnification of the image along the scanning direction of the light beam may be designated for each partial image region by segmenting the image region into a multiplicity of partial image regions, but the designation of the partial recording magnification becomes complex, and control by the frequency controlling means also becomes complex. In contrast, in the fifth aspect of the invention, since the balance of the recording magnification in each partial image region at a time when the image region is divided into a pair of partial image regions at the center of the image region is designated as the partial recording magnification of the image, the designation of the partial recording magnification is facilitated, and control by the frequency controlling means is also made simple.

A sixth aspect of the invention is characterized in that a frequency difference or a frequency ratio of the pixel clock during the period when the light beam scans the pair of partial image regions, respectively, is designated as the balance of the recording magnification in the pair of partial image regions.

In the above-described fifth aspect of the invention, the balance of the recording magnification in the pair of partial image regions may be designated by using the length of the partial image region which changes in correspondence with the recording magnification for each partial image region or by using the recording magnification itself for each partial image region, but it is preferred that the frequency difference or the frequency ratio of the pixel clock during the period when the light beam scans the pair of partial image regions, respectively, is designated as the balance of the recording magnification in the pair of partial image regions, as in the sixth aspect of the invention. The frequency difference or the frequency ratio of the pixel clock can be easily detected by counting the number of pulses for each partial image region and calculating the difference or ratio between count values, and by providing control such that the detected frequency difference or frequency ratio agrees with a designated frequency difference or frequency ratio, the partial recording magnification of the image can be made to agree with the partial recording magnification corresponding to the designated frequency difference or frequency ratio. Therefore, control is facilitated, and the configuration of the frequency controlling means can be simplified.

A seventh aspect of the invention is characterized in that the pixel clock is generated on the basis of a signal outputted from an oscillator whose oscillation frequency is controllable, and the frequency controlling means detects the pixel clock frequency during the scanning by the light beam, and controls the frequency of the signal outputted from the oscillator so that the detected frequency changes with the scope of change corresponding to the designated partial recording magnification of the image by using as the reference the frequency corresponding to the designated recording magnification of the overall image.

In the above-described first aspect of the invention, the change of the pixel clock frequency by the frequency controlling means can be specifically realized by changing a separating ratio with respect to the pixcel clock outputted from a source oscillator, as in the Unexamined Japanese Patent Application Publication No. Hei 6-242386, but in this aspect a high-frequency oscillator is required as the source oscillator, and it is difficult to record an image with high recording density. In contrast, in the seventh aspect of the invention, since the pixel clock is generated on the basis of the signal outputted from the oscillator whose oscillation frequency is controllable, the oscillation frequency of the oscillator for obtaining a pixel clock of the same frequency can be substantially lowered as compared with a case where the frequency is changed by changing the separating ratio.

In addition, in the seventh aspect of the invention, since the pixcel clock frequency during the scanning by the light beam is detected, and the frequency of the signal outputted from the oscillator is controlled so that the detected frequency changes with the scope of change corresponding to the designated partial recording magnification of the image by using as the reference the frequency corresponding to the designated recording magnification of the overall image, feedback control is provided with respect to the oscillation frequency of the oscillator. Hence, the frequency of the signal outputted from the oscillator and the pixel clock frequency can be controlled with high precision irrespective of variations in the oscillators and changes in the surrounding environment such as the temperature.

It should be noted that, as for the control of the pixel clock frequency in the seventh aspect of the invention, it is possible to effect feedback control for adjusting the oscillation frequency in real time on the basis of the detected frequency also when the laser beam is scanning the image region. More preferably, however, open-loop control should be provided in which values of parameters for controlling the oscillation frequency of the oscillator are not changed when the light beam is scanning the image region, and the values of the parameters for controlling the oscillation frequency are adjusted when the light beam is not scanning the image region.

BRIEF DESCRIPTION OF THE DRAWINGS

FIG. 10 is a conceptual diagram illustrating three elements which make up the positional misregistration and color misregistration in an image along the horizontal scanning direction.

DETAILED DESCRIPTION OF THE PREFERRED EMBODIMENTS

Figure 1:
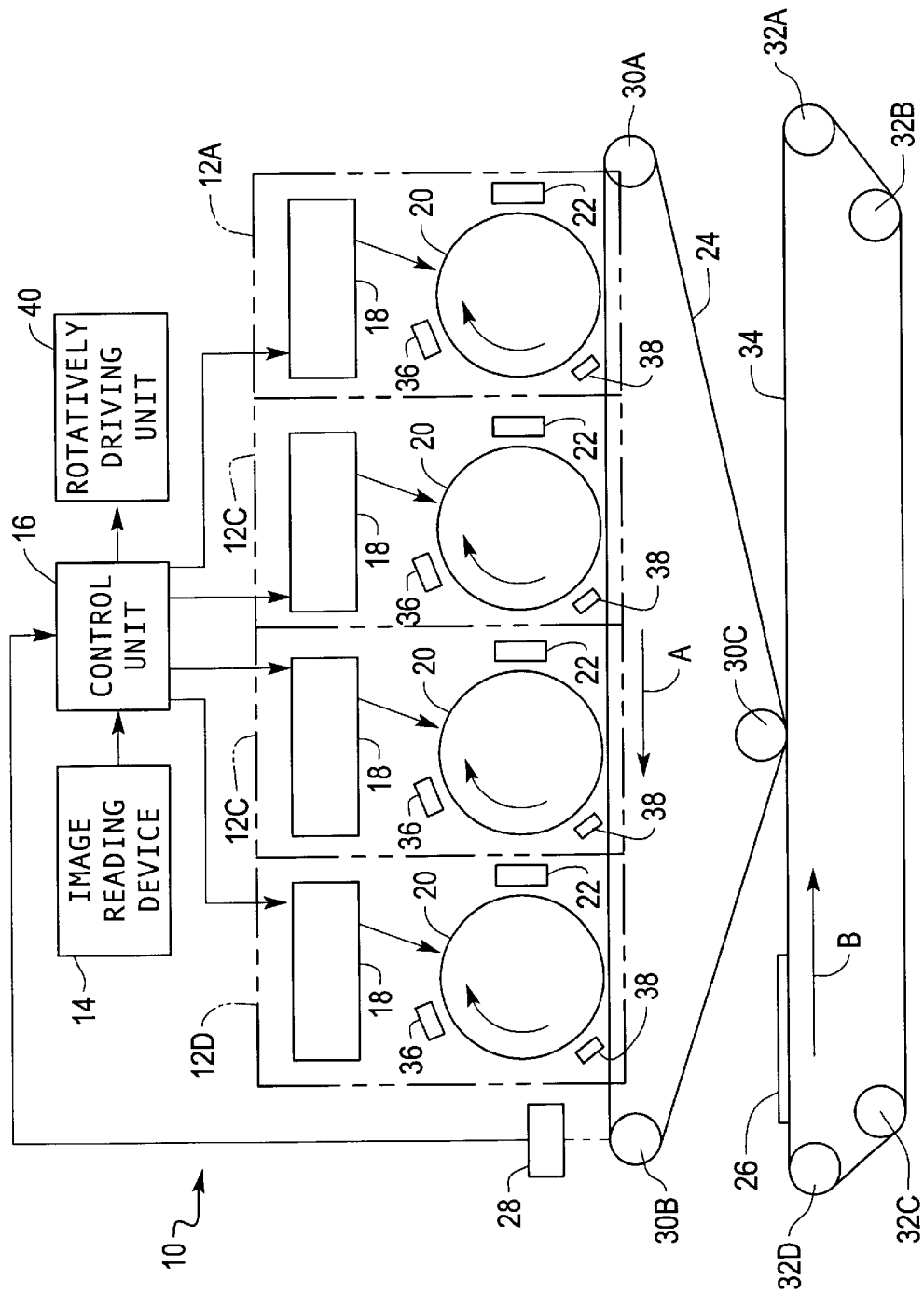
FIG. 1 is a schematic diagram of an image forming apparatus in accordance with this embodiment.

Referring now to the drawings, a detailed description will be given of an example of an embodiment of the present invention. It should be noted that although a description will be given below by using numerical values which will not present a hindrance to the present invention, the present invention should not be construed as being limited to the numerical values.

FIG. 1 shows a color-image forming apparatus 10 as the image forming apparatus in accordance with the present invention. This color-image forming apparatus 10 is comprised of an image reading device 14 for forming image signals of respective colors by separating an optical signal, which is obtained by scanning an original, into signals of the respective colors by means of filters and by effecting photoelectric conversion; a control unit 16 for controlling the overall operation of the color-image forming apparatus 10; three transport rollers 30A to 30C; an endless transfer belt 24 wound around the transport rollers 30A to 30C; four transport rollers 32A to 32D arranged on the lower side of the transfer belt 24; an endless transport belt 34 wound around the transport rollers 32A to 32D; and a rotatively driving unit 40 for rotatively driving the transfer belt 24 and the transport belt 34.

An image forming section 12A for forming a black (K) image, an image forming section 12B for forming a yellow (Y) image, an image forming section 12C for forming a magenta (M) image, and an image forming section 12D for forming a cyan (C) image are arranged above the transfer belt 24 at substantially equal intervals along the direction in which the transfer belt 24 moves (in the direction of arrow A in FIG. 1) when the rotatively driving unit 40 rotatively drives the transfer belt 24. The image forming sections 12A to 12D have identical structures, and are each provided with a photoconductor drum 20 as an object to be illuminated.

The photoconductor drum 20 is disposed in such a manner that its axis is perpendicular to the moving direction of the transfer belt 24. Disposed around each photoconductor drum 20 are a charger 36 for charging the photoconductor drum 20, a light-beam scanning device 18 for forming an electrostatic latent image by applying a laser beam to the charged photoconductor drum 20, a developing device 22 for developing the electrostatic latent image by supplying a toner of a predetermined color to the portion where the electrostatic latent image has been formed on the photoconductor drum 22 so as to form a toner image on the photoconductor drum 22, and a cleaner 38 for removing the toner remaining on the photoconductor drum 20. The toner images formed on the photoconductor drums 20 in the image forming sections 12A to 12D are respectively transferred onto the belt surface of the transfer belt 24.

Figure 2:
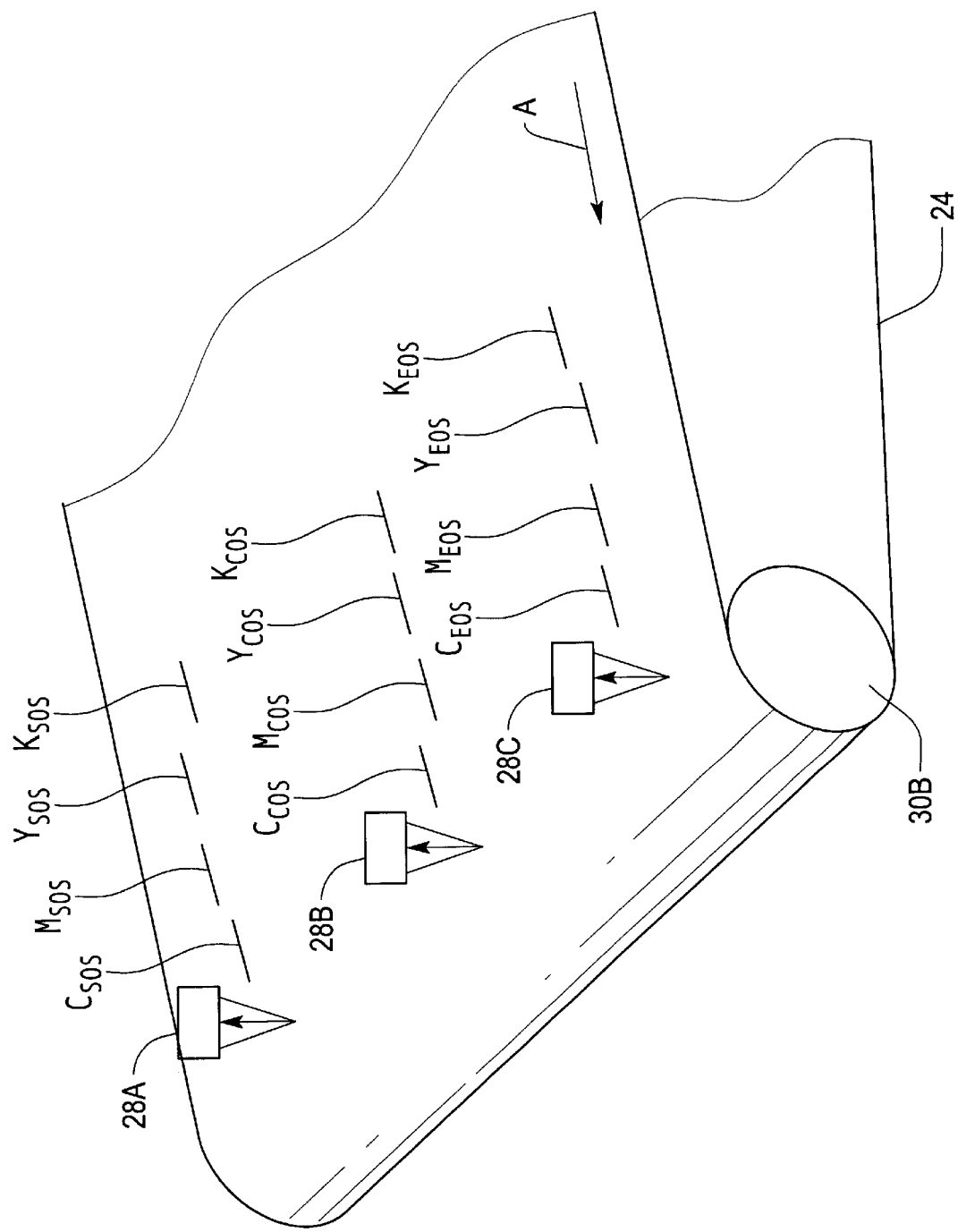
FIG. 2 is a perspective view illustrating an example of registration marks formed on a transfer belt as well as the arrangement of registration-mark detecting sensors for detecting the registration marks.

In addition, a registration-mark detecting sensor 28 is disposed downstream of the image forming sections 12A to 12D in the moving direction of the transfer belt 24. The registration-mark detecting sensor 28 is arranged such that, as shown in FIG. 2, three registration-mark detecting sensors 28A to 28C each consisting of a light-emitting device such as an LED and a light-receiving device such as a CCD sensor are arranged on the downstream side at three positions, i.e., on the central side and both sides along the transverse direction of the transfer belt 24 (at positions corresponding to a center and both ends of an image region along the transverse direction of the transfer belt 24). As the light emitted from the light-emitting devices is applied to predetermined positions on the transfer belt 24, and the light reflected by the transfer belt 24 is received by the light-receiving devices, registration marks (the details of which will be described later) formed at corresponding positions on the transfer belt 24 are respectively read by the registration-mark detecting sensors 28A to 28C. The registration-mark detecting sensor 28 is connected to the control unit 16. Incidentally, the registration-mark detecting sensor 28 corresponds to the mark detecting means stated in aspect 3.

In addition, the transport belt 34 located on the downstream side of the transfer belt 24 is arranged such that its outer peripheral surface comes into contact with an outer peripheral surface of the transfer belt 24, and the transport belt 34 is rotatively driven so as to move in the direction of arrow B in FIG. 1 by means of the rotatively driving unit 40 in synchronism with the rotative driving of the transfer belt 24. Meanwhile, a multiplicity of sheets of transfer material 26 in the form of sheets are accommodated in a stacked state in an unillustrated paper feeding tray. The transfer material 26 drawn out from the paper feeding tray is placed on the upper surface of the transport belt 34, and is transported to the position where the transfer belt 24 and the transport belt 34 are brought into contact with each other. As the transfer material 26 is nipped by the transfer belt 24 and the transport belt 34, the toner image formed on the outer peripheral surface of the transfer belt 24 is transferred to the transfer material 26. On the transfer material 26 with the toner image transferred thereto, the toner image is fixed by an unillustrated fixing device. Consequently, a color image is formed on the transfer material 26.

Figure 3:
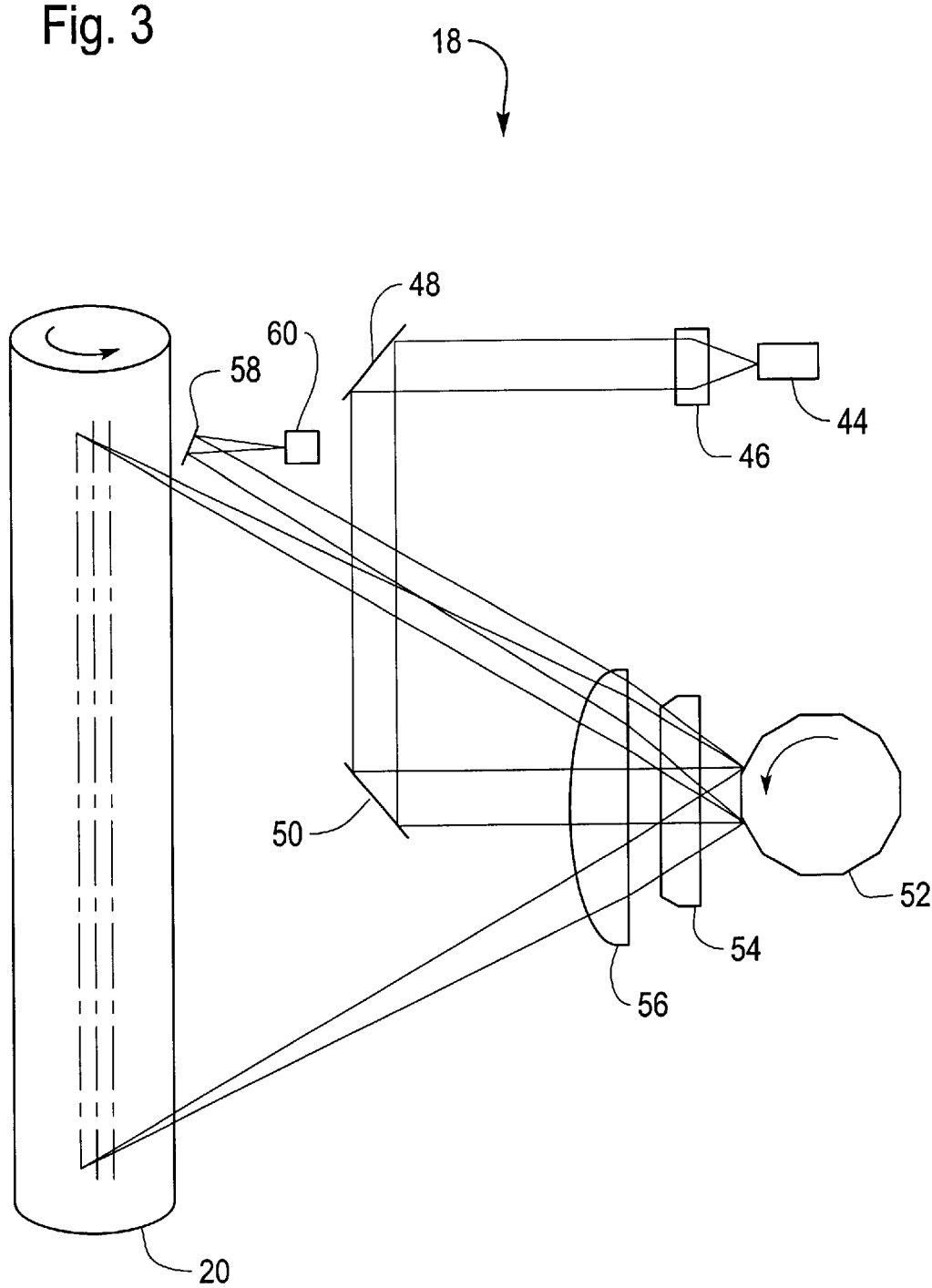
FIG. 3 is a plan view illustrating a schematic configuration of an optical system of a laser-beam scanning device.

Next, a description will be given of the configuration of the light-beam scanning device 18. As shown in FIG. 3, the light-beam scanning device 18 has a laser diode (LD) 44. In this embodiment, a dual-spot laser diode which has two light-emitting spots and emits laser beams from the respective light-emitting spots is used as the LD 44. A collimator lens 46 and plane mirrors 48 and 50 are consecutively arranged on the laser beam-emitting side of the LD 44, while a polygon mirror 52 with a multiplicity of reflecting surfaces formed on its outer periphery is arranged on the laser beam-emitting side of the plane mirror 50. The laser beam emitted from the LD 44, after being converted to a parallel beam by the collimator lens 46, is made incident upon the reflecting surface of the polygon mirror 52 as a beam of light wider than the width of the reflecting surface of the polygon mirror 52 by an unillustrated optical component such as a cylindrical lens (the so-called over-field optical system).

fθ lenses 54 and 56 are consecutively arranged on the laser beam-emitting side of the polygon mirror 52. The laser beam which has been deflected along a predetermined direction by being reflected by the reflecting surface of the polygon mirror 52 is transmitted through the fθ lenses 54 and 56, is made emergent from the light-beam scanning device 18 through optical members such as an unillustrated cylindrical mirror and a plane mirror, and is applied to the photoconductor drum 20. The laser beam applied to the photoconductor drum 20 is made to scan the peripheral surface of the photoconductor drum 20 (horizontal scanning) along a direction parallel to the axis of the photoconductor drum 20 in conjunction with the rotation of the polygon mirror 52. It should be noted that vertical scanning is effected as the photoconductor drum 20 rotates.

The LD 44 is disposed such that the direction in which its two light-emitting spots are arranged is substantially perpendicular to the direction of deflection of the laser beam by the polygon mirror 52. Accordingly, when the polygon mirror 52 rotates by an angle corresponding to one scan of the laser beam, a two-line portion of an image (electrostatic latent image) is formed on the photoconductor drum 20.

In addition, a reflecting mirror 58 is disposed on the laser beam-emitting side of the fθ lens 56 at a position corresponding to an end portion (SOS: start of scan) on the scan starting side of the overall scanning range of the laser beam, and the laser beam reflected by the reflecting mirror 58 is made incident upon a start-position detecting sensor 60. The laser beam emergent from the LD 44 is made incident upon the start-position detecting sensor 60 through the reflecting mirror 58, when the surface which is reflecting the laser beam among the reflecting surfaces of the polygon mirror 52 has assumed a direction for reflecting the incident beam in a direction corresponding to SOS. Accordingly, the start position signal SOS outputted from the start-position detecting sensor 60 becomes a signal in which a pulse of a short pulse width is outputted in a fixed period (each time the laser beam is incident upon the sensor 60) normally at a low level.

Figure 4:
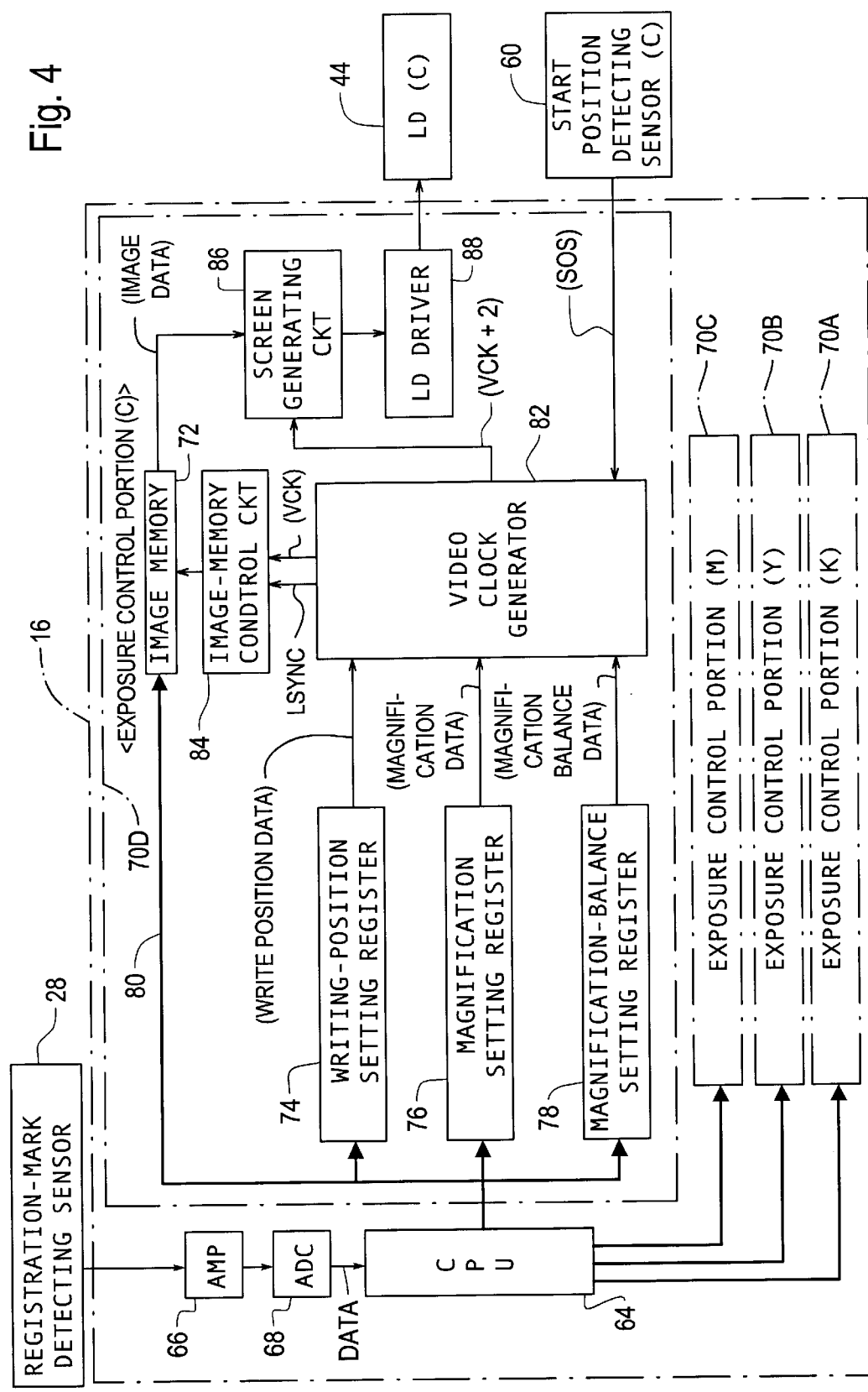
FIG. 4 is a block diagram illustrating a schematic configuration of that portion of control unit of the image forming apparatus which concerns control of the light-beam scanning device.

Next, a description will be given of the control unit 16. FIG. 4 shows that portion of the control unit 16 which concerns control of the light-beam scanning device 18. As shown in FIG. 4, the control unit 16 is configured by comprising a CPU 64, and is provided with a ROM in which a program for controlling the overall color-image forming apparatus 10 as well as image data for forming registration marks, which will be described later, are stored; a RAM used as an input/output buffer and a work area; a nonvolatile memory capable of rewriting the stored contents such as an EEPROM; and an operating panel, although these portions are not shown in the drawing.

The registration-mark detecting sensor 28 described earlier is connected to the CPU 64 through an amplifier 66 and an analog-to-digital converter (ADC) 68, and a signal outputted from the registration-mark detecting sensor 28 is inputted as registration data. In addition, exposure control portions 70A to 70D, which are respectively provided in correspondence with the light-beam scanning devices 18 of the image forming sections 12A to 12D, are respectively connected to the CPU 64. Since the exposure control portions 70A to 70D have identical structures, a description will be given below of only the exposure control portion 70D provided in correspondence with the light-beam scanning device 18 of the image forming section 12D.

The exposure control portion 70D has an image memory 72, a writing-position setting register 74, a magnification setting register 76, and a magnification-balance setting register 78, and these registers are connected to the CPU 64 through a data bus 80. The CPU 64 causes the image data representing an image (a C image), which is to be formed by the image forming section 12D corresponding to the exposure control portion 70D, to be stored in the image memory 72 through the data bus 80.

In addition, the CPU 64 causes write position data XM, magnification data MG, and magnification balance data BLC, which are determined by color-misregistration correction processing which will be described later, to be set in the registers 74, 76, and 78, respectively. The registers 74, 76, and 78 are connected to a video clock generator 82, and the aforementioned respective data inputted from the CPU 64 is inputted to the video clock generator 82 through the registers 74 to 78.

It should be noted that the write position data XM is data which designates a period (a starting end position of an image region using SOS as a reference) from the time the laser beam is detected by the start-position detecting sensor 60 until the writing of an image by the laser beam is started (the recording of an image is started) by the combination of the number of pulses of a video pixel clock VCK*2 and the phase of the video pixel clock VCK*2. Meanwhile, the magnification data MG is data which designates the recording magnification of the overall image along the scanning direction of the laser beam by the average frequency of the video pixel clock VCK*2 at a time when the laser beam is scanning the image region.

Furthermore, the magnification balance data BLC is data which, after the image region is divided into two partial image regions on the SOS side and the EOS (end of scan) side, designates a partial recording magnification of the image along the scanning direction of the laser beam by the difference between the average frequency of the video pixel clock VCK*2 when the laser beam is scanning the SOS-side partial image region and the average frequency of the video pixel clock VCK*2 when the laser beam is scanning the EOS-side partial image region.

The start-position detecting sensor 60 of the light-beam scanning device 18 in the image forming section 12D is connected to the video clock generator 82, and the start position signal SOS is inputted from the start-position detecting sensor 60. The video clock generator 82 generates a line synchronizing signal LSYNC, a video pixel clock VCK, and the video pixel clock VCK*2 of a frequency which is two times that of the video pixel clock VCK, all of which are set to high level (active) only during the period when the laser beam is scanning the image region on the photoconductor drum 20, on the basis of the write position data XM, the magnification data MG, and the magnification balance data BLC inputted through the registers 74, 76, and 78, respectively, as well as the start position signal SOS inputted from the start-position detecting sensor 60. The video clock generator 82 controls the frequencies of the video pixel clock VCK and the video pixcel clock VCK*2 during the period of one scan by the laser beam in response to the magnification data MG and the magnification balance data BLC, although their details will be described later.

Incidentally, for reference, if it is assumed that the recording density of the image is 600 spi, that the process speed (the peripheral speed of the photoconductor drum 20) is 263.89 mm/s, that the length of the optical scanning range of the laser beam on the photoconductor drum 20 is 348 mm, and that the length of the image range along the horizontal scanning direction is 297 mm, the period when the start position signal SOS is set to high level, i.e., the scanning period of the laser beam using the polygon mirror 52, is 320.89 ms, the normal frequency of the video pixel clock VCK is 25.62 MHz, and the normal frequency of the video pixcel clock VCK*2 is 51.24 MHz.

An image-memory control circuit 84 and a screen generating circuit 86 are connected to the video clock generator 82, and the line synchronizing signal LSYNC and the video pixcel clock VCK are outputted to the image-memory control circuit 84, while the video pixel clock VCK*2 is outputted to the screen generating circuit 86. The image-memory control circuit 84 is connected to the image memory 72, and a data output terminal of the image memory 72 is connected to the screen generating circuit 86. The image-memory control circuit 84 provides control such that the output of image data from the image memory 72 to the screen generating circuit 86 is effected at a timing synchronized with the video pixcel clock VCK during the period when the line synchronizing signal LSYNC is active.

The screen generating circuit 86 generates a signal of a triangular waveform on the basis of the video pixcel clock VCK*2 inputted from the video clock generator 82, compares levels of that signal of the triangular waveform and a signal obtained by subjecting the image data inputted from the image memory 84 to digital-to-analog conversion by using a comparator, and generates a modulating signal for subjecting the LD 44 to pulse-width modulation on the basis of the result of comparison. It should be noted that, as the screen generating circuit 86, it is possible to adopt the configuration described in Unexamined Japanese Patent Application Publication No. Sho 62-39975, for example. The screen generating circuit 86 is connected to the LD 44 through an LD driver 88, and is modulated and driven on the basis of the modulating signal outputted from the screen generating circuit 86.

With respect to the light-beam scanning devices 18 of the image forming sections 12A to 12D as well, their LDs 44 are respectively modulated by the exposure control portions 70A to 70C in correspondence with the image data on one of K, Y, and M in the same way as described above. As a result, an electrostatic latent image of one of the K image, the Y image, the M image, and the C image to be formed on the transfer material 26 is formed on the photoconductor drum 20 of each of the image forming sections 12A to 12D. As these electrostatic latent images are respectively developed into the respective colors of K, Y, M, and C by the developing devices 22, toner images of the respective colors are formed on the photoconductor drums 20. As these toner images are superposed on the transfer belt 24, a color image (toner image) is formed on the transfer belt 24.

Figure 5:
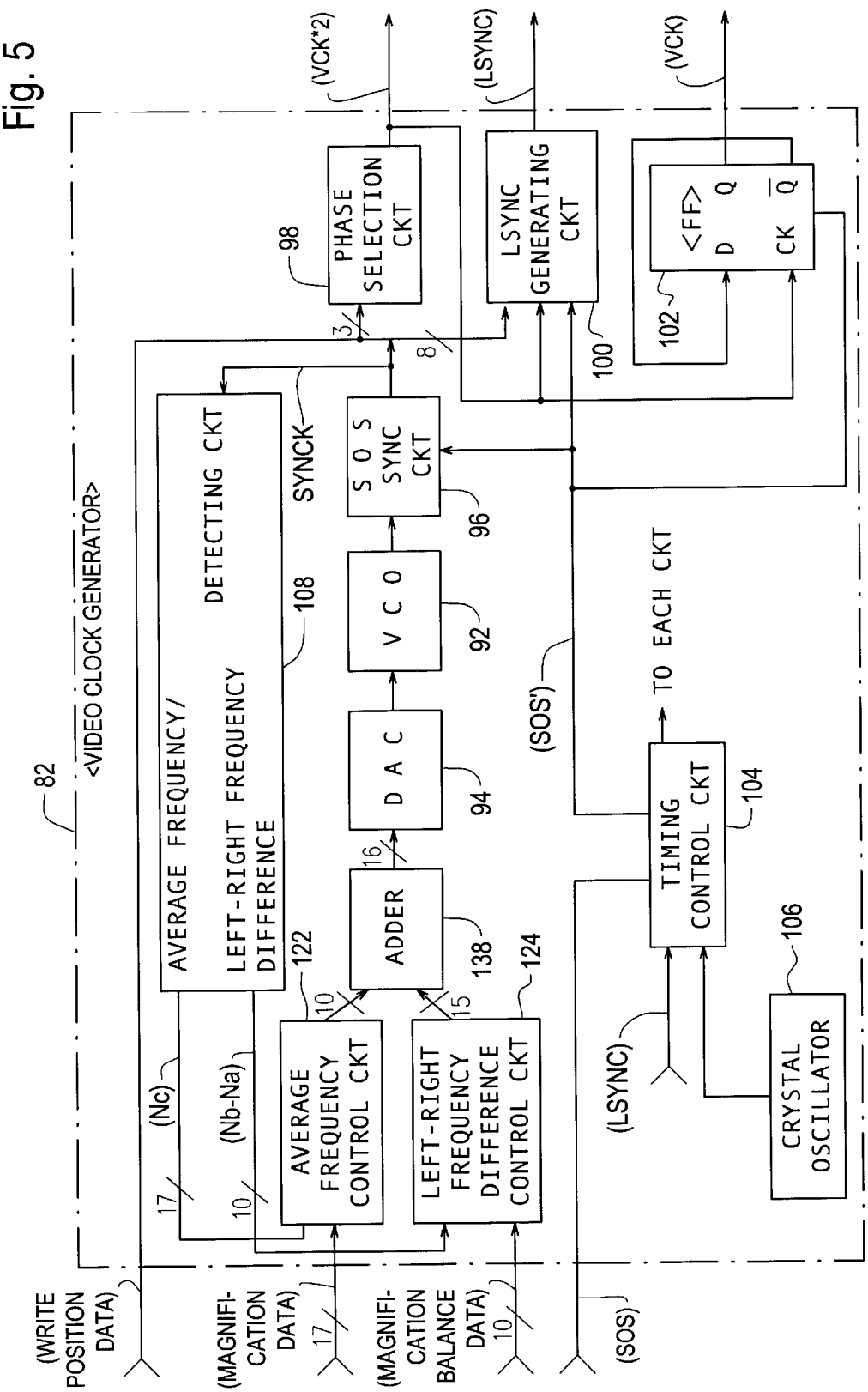
FIG. 5 is a block diagram illustrating a schematic configuration of a video clock generator.

Next, a description will be given of the video clock generator 82. As shown in FIG. 5, the start position signal SOS outputted from the start-position detecting sensor 60 is inputted to a timing control circuit 104 of the video clock generator 82. The timing control circuit 104 inverts the level of the inputted start position signal SOS, and outputs it as a start position signal SOS' (see FIG. 7). In a case where the start position signal SOS is not being inputted due to the fact that the LD 44 is not being lit or the polygon mirror 52 is not being rotated or other similar reason, the timing control circuit 104 outputs the dummy start position signal SOS' in which a pulse-like level change occurs in a period which is approximately 1.1 times that of the start position signal SOS. This dummy start position signal SOS' is generated on the basis of a signal of a fixed frequency (e.g., 5 MHz) inputted from a crystal oscillator 106 connected to the timing control circuit 104.

In addition, the video clock generator 82 has a voltage-controlled oscillator (VCO) 92. The control signal input terminal of the VCO 92 is connected to the signal output terminal of a digital-to-analog converter (DAC) 94, which outputs a signal of a frequency corresponding to the level of the signal inputted thereto from the DAC 94 (that frequency corresponds to a frequency which is two times that of the video pixcel clock VCK, i.e., the frequency of the video pixel clock VCK*2). The signal output terminal of the VCO 92 is connected to the signal input terminal of an SOS synchronizing circuit 96. The start position signal SOS' is also inputted to the SOS synchronizing circuit 96 from the timing control circuit 104, and the SOS synchronizing circuit 96 generates a synchronizing pixcel clock SYNCK by changing the phase of the signal outputted from the VCO 92 so as to be synchronized with the rise of the start position signal SOS'. Incidentally, as the SOS synchronizing circuit 96, it is possible to adopt the configuration described in the Unexamined Japanese Patent Application publication No. Sho 55-53779, for example.

The signal output terminal of the SOS synchronizing circuit 96 is connected to the signal input terminal of a phase selection circuit 98. On the basis of the synchronizing pixel clock SYNCK inputted from the SOS synchronizing circuit 96, the phase selection circuit 98 generates eight kinds of synchronizing pixel clocks SYNCK whose phases are mis-registration from each other by a time duration corresponding to about one-fourth period of the synchronizing pixcel clock SYNCK (i.e., by about one-eighth period of the video pixcel clock VCK). Of the write position data XM, 3-bit ($2^3=8$) data for designating the phase of the video pixel clock VCK*2 is inputted to the phase selection circuit 98, and the phase selection circuit 98 selectively outputs one of the eight kinds of synchronizing pixcel clocks SYNCK as the video pixel clock VCK*2 in accordance with the value of the inputted data.

The signal output terminal of the phase selection circuit 98 is connected to a LSYNC generating circuit 100 and a D flip-flop (FF) 102, and the video pixel clock VCK*2 outputted from the phase selection circuit 98 is inputted to the screen generating circuit 86 (see FIG. 4) and is also inputted to the LSYNC generating circuit 100 and the F 102. The FF 102 receives the video pixel clock VCK*2 at its CK input (clock input), and generates the video pixel clock VCK in which the video pixel clock VCK*2 is separated into one-seconds. The video pixel clock VCK is inputted to the image-memory control circuit 84 through a Q output.

Of the write position data XM, 8-bit data for designating the number of pulses of the video pixel clock VCK*2 is inputted to the LSYNC generating circuit 100, and the start position signal SOS' is inputted thereto from the timing control circuit 104. The LSYNC generating circuit 100 starts counting the number of pulses of the video pixel clock VCK*2 at the rise of the start position signal SOS', and when the count value agrees with the number of pulses represented by the inputted data, the LSYNC generating circuit 100 sets the output signal (line synchronizing signal LSYNC; see FIG. 7) to high level (active), resets the count value to 0, and continues to count the number of pulses. Then, when the count value agrees with a predetermined value (the number of pixels per line), the LSYNC generating circuit 100 returns the line synchronizing signal LSYNC to low level. The line synchronizing signal LSYNC is inputted to the image-memory control circuit 84 (see FIG. 4) and the timing control circuit 104.

The output of the modulating signal from the screen generating circuit 86 is started when the line synchronizing signal LSYNC becomes active, and a laser beam for recording an image is emitted in conjunction with the output of this modulating signal. Therefore, when the phase selection circuit 98 outputs the video pixel clock VCK*2 of the phase designated by the write position data XM, and the count value of the number of pulses of the video pixel clock VCK*2 outputted from the phase selection circuit 98 has agreed with the number of pulses designated by the write position data XM, the LSYNC generating circuit 100 sets the line synchronizing signal LSYNC in an active state. As a result, the image writing position is adjusted by using as a unit the distance corresponding to a one-eighth period of the video pixel clock VCK in accordance with the write position data XM. Thus, the position selection circuit 98 and the LSYNC generating circuit 100 correspond to a modulation controlling means in accordance with the present invention.

Figure 7:
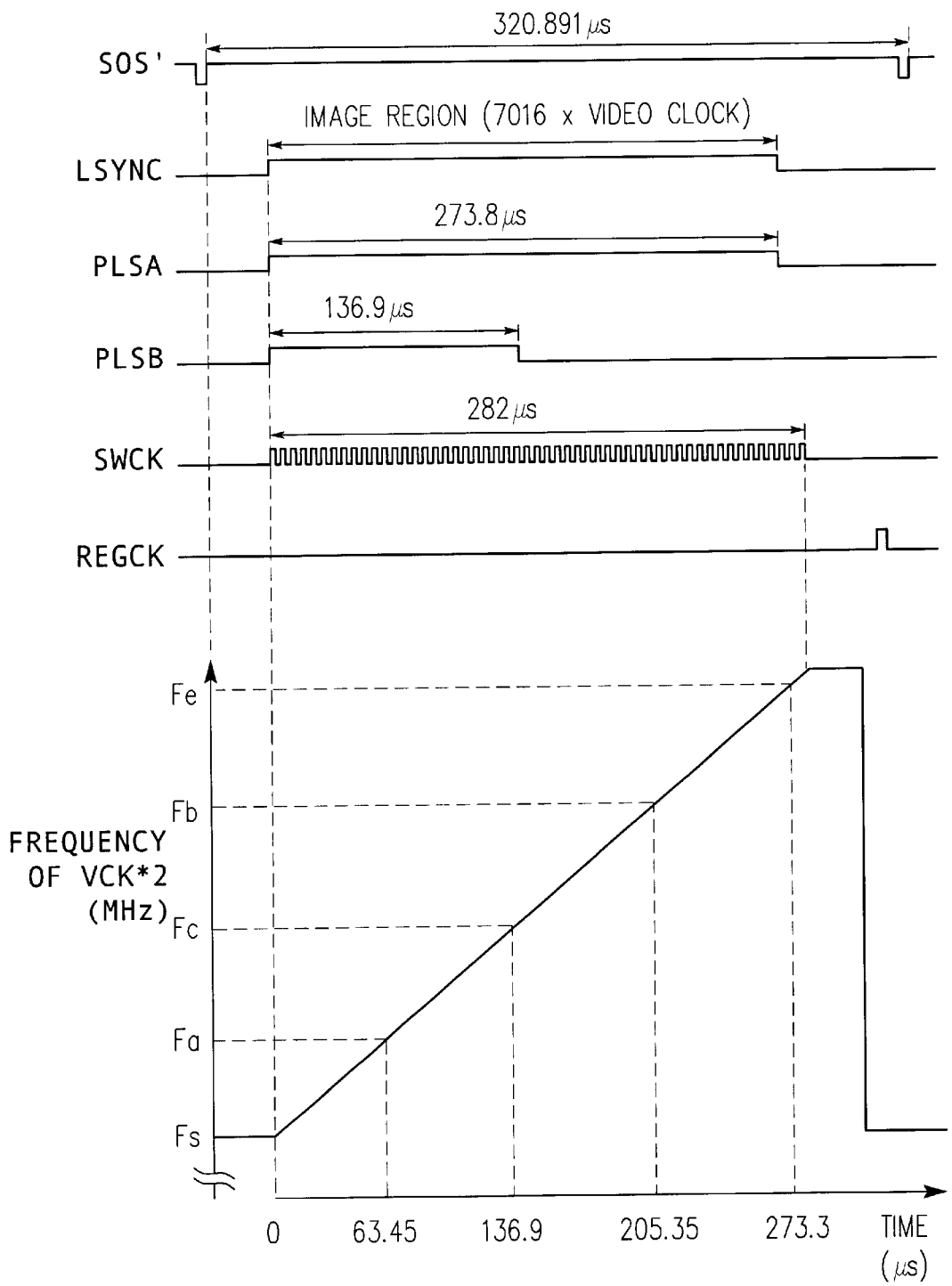
FIG. 7 is a timing chart illustrating the transition of a start position signal SOS', a line synchronizing signal LSYNC, pulse count signals PLSA and PLSB, a sweep pixel clock SWCK, and a register pixcel clock REGCK, as well as the frequency of a video pixcel clock VCK*2 based on these signals.

In addition, on the basis of the signal of a fixed frequency inputted from the crystal oscillator 106 as well as the line synchronizing signal LSYNC, the timing control circuit 104 generates pulse count signals PLSA and PLSB, a sweep pixel clock SWCK, and a registration pixel clock REGCK, respectively, which are shown in FIG. 7. Incidentally, the pulse count signal PLSA is a signal which rises (becomes active) at the same timing as the line synchronizing signal LSYNC, and falls after the lapse of a predetermined fixed time duration (a time duration approximately equivalent to the time duration when the line synchronizing signal LSYNC is active), while the pulse count signal PLSB is a signal which rises (becomes active) at the same timing as the line synchronizing signal LSYNC, and falls after the lapse of a predetermined fixed time duration (a time duration one-half the time duration when the pulse count signal PLSA is active).

Incidentally, for reference, if it is assumed that the recording density of the image is 600 spi, that the process speed is 263.89 mm/s, that the length of the optical scanning range of the laser beam on the photoconductor drum 20 is 348 mm, and that the length of the image range along the horizontal scanning direction is 297 mm, the length of the time duration when the pulse count signal PLSA is made active can be set to 273.8 ms, and the length of the time duration when the pulse count signal PLSB is made active can be set to 136.9 ms.

In addition, the generation of the sweep pixel clock SWCK can be achieved as a signal from the crystal oscillator 106 is outputted during the lapse of a predetermined time duration from the time line synchronizing signal LSYNC rises until the line synchronizing signal LSYNC positively falls (the length of the time duration when the line synchronizing signal LSYNC remains active slightly changes as a result of adjustment of the level of the signal inputted to the VCO 92, as will be described later). Further, the generation of the registration pixel clock REGCK can be achieved as a pulse of a short pulse width is outputted after the lapse of a predetermined time duration from the time the outputting of the signal from the crystal oscillator 106 as the sweep pixel clock SWCK is stopped.

Meanwhile, the synchronizing pixel clock SYNCK outputted from the SOS synchronizing circuit 96 is inputted to an average frequency/left-right frequency difference detecting circuit 108 (hereafter, simply referred to as the "frequency detecting circuit 108").

Figure 6B:
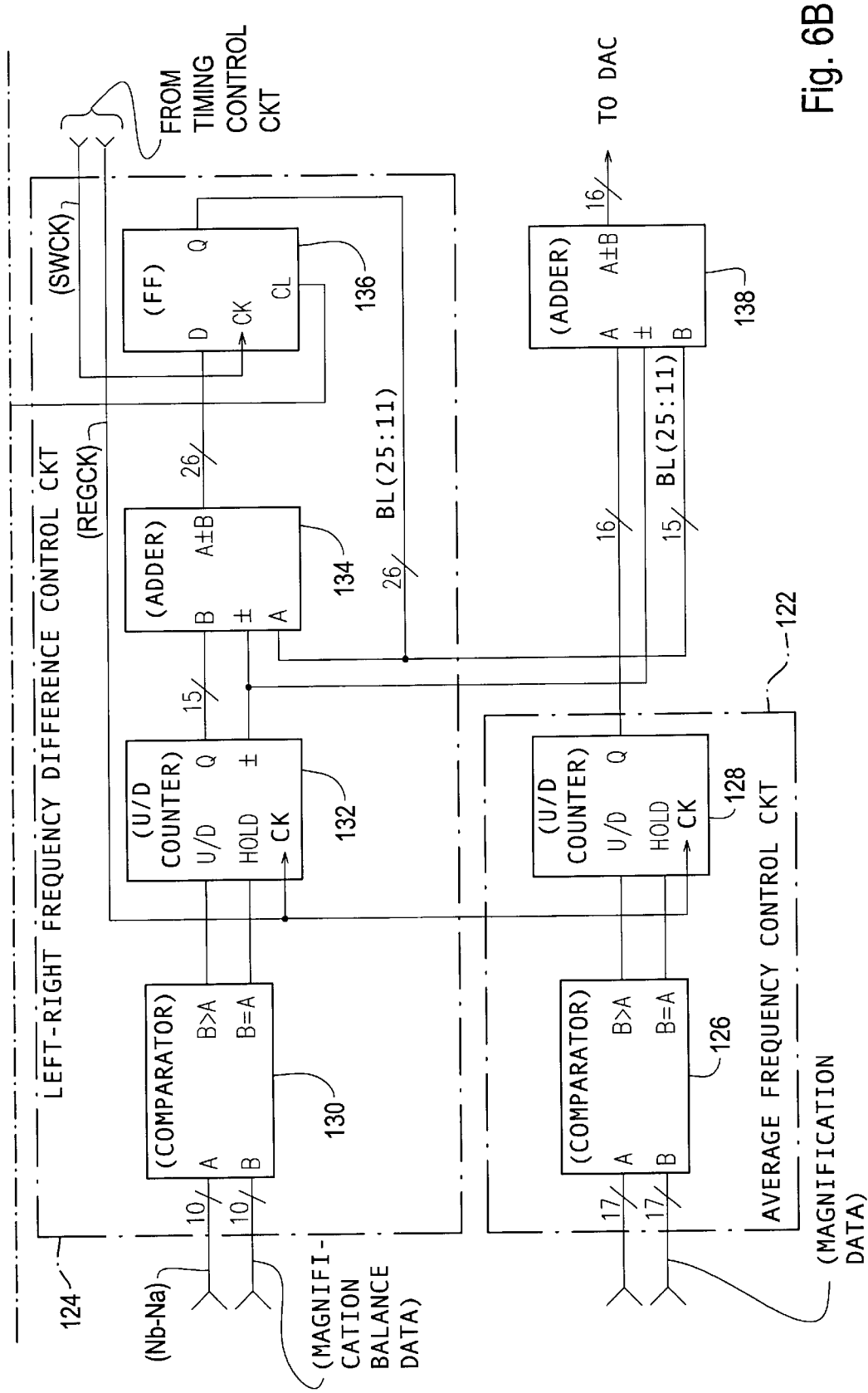
FIG. 6 is a block diagram illustrating schematic configurations of an average frequency Fc/left-right frequency difference Fb–Fa detecting circuit, an average frequency control circuit, and a left-right frequency difference control circuit in the video clock generator.

As shown in FIG. 6, the detecting circuit 108 has five 13-bit counters 110A to 110E and four delay circuits 112A to 112D. Each of the delay circuits 112A to 112D delays the inputted signal for a fixed time duration (a time duration of one-fifth or thereabouts of one period of the synchronizing pixel clock SYNCK (e.g., 3.9 ns), and outputs the same. Since the delay circuits 112A to 112D are connected in series, and the synchronizing pixel clock SYNCK is inputted to the delay circuit 112A, five kinds of synchronizing pixel clocks SYNCK whose phases are misregistration from each other by an approximately one/fifth period, including the original synchronizing pixel clock SYNCK inputted to the frequency detecting circuit 108, are obtained by the delay circuits 112A to 112D, and these pixel clocks are inputted to the counters 110A to 110E through their CK inputs, respectively.

The pulse count signal PLSA is inputted to the counters 110A to 110E through their E inputs, respectively, and the start position signal SOS' is inputted thereto through their CL inputs. As is apparent from a truth table shown in Table 1 below, each of the counters 110A to 110E operates only when the CL input is at high level (the count value is reset when the CL input is set to low level), and holds the count value when the E input is at low level. When the count value when the E input is at high level, the counter increments the count value by "1" each time the pulse signal inputted through the CK input changes from low level to high level.

TABLE 1

<Truth Table of 13-bit Counter>

| Input | | | |
|---|---|---|---|
| E | CK | CL | Q output |
| H | ↑ | H | $Q_{n-1} + 1$ |
| L | X | H | $Q_{n-1}$ |
| X | X | L | L |

Accordingly, while the pulse count signal PLSA is active, each of the counters 110A to 110E counts the number of pulses of the inputted synchronizing pixcel clock SYNCK, and resets the count value each time the start position signal SOS' is set to low level (each time an ensuing laser beam scanning is started). Q outputs of the counters 110A to 110E are respectively connected to input terminals of a full adder 114 and D inputs of a latch 116.

Since the full adder 114 adds the count values inputted from the counters 110A to 110E, during the period from the time the pulse count signal PLSA is set to low level until an ensuing laser beam scanning is started, data representing the number of pulses of a signal of a frequency which is five times that of the synchronizing pixel clock SYNCK during the period when the pulse count signal PLSA is active is outputted from the full adder 114 as average frequency data Nc.

A value obtained by separating this average frequency data Nc by 5 is a value which represents the number of pulses of the synchronizing pixel clock SYNCK during the period when the pulse count signal PLSA is active with the accuracy of a ±⅕ pulse. Since the length of the period when the pulse count signal PLSA is active is constantly fixed, the data outputted from the full adder 114 corresponds to the average frequency of the synchronizing pixel clock SYNCK (and the video pixcel clock VCK*2) during the period when the pulse count signal PLSA is active (which substantially coincides with the period when the laser beam is scanning the image region).

Meanwhile, when the pulse count signal PLSB is inputted to the latch 116 through its CK input, and the pulse count signal PLSB has changed from high level to low level, the latch 116 holds the count values inputted from the counter 110A to 110E. Q outputs of the latch 116 are connected to input terminals of a full adder 118, and data representing the number of pulses of a signal of a frequency which is five times that of the synchronizing pixel clock SYNCK during the period when the pulse count signal PLSB is active is outputted from the full adder 118 as average frequency data Na.

A value obtained by separating this average frequency data Na by 5 is a value which represents the number of pulses of the synchronizing pixel clock SYNCK during the period when the pulse count signal PLSB is active with the accuracy of a ±⅕ pulse. Since the length of the period when the pulse count signal PLSB is active is constantly fixed (½ of the period when the signal PLSA is active), the data outputted from the full adder 118 corresponds to the average frequency (=the average frequency of the video pixel clock VCK*2) of the synchronizing pixcel clock SYNCK during the period when the pulse count signal PLSB is active (which substantially coincides with the period when the laser beam is scanning the SOS-side partial image region).

An output terminal of the full adder 114 is connected to an A input of an adder 120, while an output terminal of the full adder 118 is connected to a B input of the adder 120. "A-2B" is calculated by using data A inputted through the A input and data B inputted through the B input. Since the relationship of "Nc=Na+Nb" holds between the average frequency data Nc and the average frequency data Na (where Nb is the number of pulses corresponding to the average frequency of the video pixel clock VCK*2 when the laser beam is scanning the EOS-side partial image region), data "Nb−Na," which corresponds to the difference in the average frequency of the video pixel clock VCK*2 between when the laser beam is scanning the SOS-side partial image region and when the laser beam is scanning the EOS-side partial image region, is outputted from the adder 120 (hereafter, this data will be referred to as the "left-right frequency difference data Nb−Na").

As shown in FIG. 5, an average-frequency control circuit 122 and a left-right frequency difference control circuit 124 are connected to the aforementioned frequency detecting circuit 108. The average-frequency control circuit 122 has a comparator 126, and the average frequency data Nc outputted from the full adder 114 of the frequency detecting circuit 108 is inputted to the A input of the comparator 126, while the magnification data MG outputted from the magnification setting register 76 is inputted to the B input thereof. The comparator 126 compares the data A inputted through the A input with the data B inputted through the B input, and changes over the level of the signal to be outputted through a (B>A) output and a (B=A) output in correspondence with the result of comparison (the relationship of relative magnitude between the data A and the data B), as shown in the truth table shown in Table 2 below.

TABLE 2

<Truth Table of Comparator>

| Input | Output | |
|---|---|---|
| | (B > A) | (B = A) |
| B > A | H | L |
| B = A | L | H |
| B < A | L | L |

The (B>A) output of the comparator 126 is connected to an U/D input of an up/down (U/D) counter 128, and the (B=A) output of the comparator 126 is connected to a HOLD input of the U/D counter 128. Further, the registration pixel clock REGCK generated by the timing control circuit 104 is inputted to a CK input of the U/D counter 128.

As is apparent from the truth table shown in Table 3 below, when the signal inputted through the HOLD input is at high level, the U/D counter 128 holds the count value, whereas when the signal inputted through the HOLD input is at low level, at the rise of the signal inputted through the CK input, if the signal inputted through the U/D input is at high level (i.e., the result of comparison by the comparator 126 is B>A), the U/D counter 128 increments the count value by "1," and if the signal inputted through the U/D input is at low level (i.e., the result of comparison by the comparator 126 is B>A), the U/D counter 128 decrements the count value by "1."

TABLE 3

<Truth Table of U/D Counter>

| Input | | | Q output |
|---|---|---|---|
| U/D | HOLD | CK | |
| H | L | ↑ | $Q_{n-1} + 1$ |
| L | L | ↑ | $Q_{n-1}$ |
| X | H | X | L |

Accordingly, if the average frequency data Nc is smaller than the magnification data MG, the count value outputted from the Q output of the U/D counter 128 is gradually increased (incremented by 1 each time the laser beam undergoes one scanning), whereas if the average frequency data Nc is greater than the magnification data MG, that count value is gradually decreased (decremented by 1 each time the laser beam undergoes one scanning)

Further, the left-right frequency difference control circuit 124 has a comparator 130 having the same configuration as that of the aforementioned comparator 126, and the left-right frequency difference data Nb−Na outputted from the adder 120 of the frequency detecting circuit 108 is inputted to an A input of the comparator 130, while the magnification balance data BLC outputted from the magnification-balance setting register 78 is inputted to a B input thereof. A (B>A) output of the comparator 130 is connected to an U/D input of an U/D counter 132 having the same configuration as the aforementioned U/D counter 128, while a (B=A) output of the comparator 132 is connected to a HOLD input of the U/D counter 132. In addition, the registration pixel clock REGCK generated by the timing control circuit 104 is inputted to a CK input of the U/D counter 132.

Accordingly, if the left-right frequency difference data Nb–Na is smaller than the magnification balance data BLC, the count value outputted from a Q output of the U/D counter 132 is gradually increased (incremented by 1 each time the laser beam undergoes one scanning), whereas if the left-right frequency difference data Nb–Na is greater than the magnification balance data BLC, that count value is gradually decreased (decremented by 1 each time the laser beam undergoes one scanning).

The Q output of the U/D counter 132 is connected to a B input of an adder 134, and a ± output (sign data representing a positive or negative sign of the count value is outputted) of the U/D counter 132 is connected to a ± input of the adder 134. The adder 134 adds data B inputted through its B input to data A inputted through its A input by taking into consideration the value of the sign data (the sign of the B data) inputted through its ± input, and outputs the result of addition through its A±B output. The A±B output of the adder 134 is connected to a D input of a D flip-flop (FF) 136, and the result of addition by the adder 134 is held in the FF 136.

The sweep pixel clock SWCK generated by the timing control circuit 104 is inputted to the FF 136 through its CK input, and the start position signal SOS' is also inputted thereto through its CL input. In addition, a Q output of the FF 136 is connected to the A input of the adder 134. When the start position signal SOS' rises, the FF136 clears the data it holds, and when the sweep pixcel clock SWCK is inputted thereto, the FF 136 holds the data inputted thereto through its D input at the rise of the sweep pixel clock SWCK, and concurrently outputs its held data through its Q output.

The data outputted through the Q output of the FF 136 is inputted to the adder 134 through its A input, and the data inputted through the B input is added thereto and is outputted to the FF 36. Accordingly, the data held in the FF 136 is monotonously increased or monotonously decreased at a timing synchronized with the sweep pixel clock SWCK by using a count value outputted from the Q output of the U/D counter 132 as a portion of its change.

In addition, 26 bit lines (BL) are connected to the Q output of the FF 136, and 26-bit data is outputted from the Q output. Of these bit lines, 15 bit lines for transmitting high-order 15-bit data are connected to a B input of an adder 138, while high-order 15-bit data outputted through the Q output of the FF136 is inputted to the adder 136. In addition, an A input of the adder 138 is connected to the Q output of the U/D counter 128, and the ± input of the adder 138 is connected to the ± output of the U/D counter 132. In the same way as the adder 134 described before, the adder 138 adds data B inputted through its B input to data A inputted through its A input by taking into consideration the value of the sign data (the sign of the B data) inputted through its ± input, and outputs the result of addition through its A±B output.

It should be noted that while the sweep pixel clock SWCK is being inputted to the FF 136, the value of data (the result of addition) outputted from the adder 138 through its A±B output changes (increases monotonously or decreases monotonously) with the change in the value of the data inputted through the B input of the adder 138; however, since the data inputted through the B input is the high-order 15-bit data of the 26-bit data outputted from the F 136, the value of the data outputted from the adder 138 changes smoothly. The A±B output of the adder 138 is connected to a data input terminal of the DAC 94 (see FIG. 5), and the DAC 94 outputs to the VCO 92 an analog signal at a level corresponding to the value of the data inputted thereto from the adder 138.

Through the above, as shown in FIG. 7, during the period from the time the start position signal SOS' rises until the line synchronizing signal LSYNC rises (while the laser beam is scanning the region outside the SOS-side image region), the frequency of the signal outputted from the VCO 92 (=the frequency of the video pixel clock VCK*2) is fixed at a frequency corresponding to the count value being held in the U/D counter 128; however, while the sweep block signal SWCK is being inputted to the FF 136 after the rise of the line synchronizing signal LSYNC, the frequency gradually changes with a fixed gradient corresponding to the count value being held in the U/D counter 132.

The count values which are held in the U/D counters 128 and 132 are not changed while the laser beam is scanning the image region. However, when the registration pixel clock REGCK is set to high level, the count value being held in the U/D counter 128 is incremented or decremented on the basis of the signal inputted from the comparator 126 such that the value of the average frequency data Nc approaches the value of the magnification data MG, while the count value being held in the U/D counter 132 is incremented or decremented on the basis of the signal inputted from the comparator 130 such that the value of the left-right frequency difference data Nb–Na agrees with the value of the magnification balance data BLC.

Accordingly, by using one scanning by the laser beam as a unit, feedback control of the average frequency Fc and the left-right frequency difference Fb–Fa of the video pixel clock VCK*2 is effected such that the average frequency data Nc agrees with the magnification data MG and such that the left-right frequency difference data Nb–Na agrees with the magnification balance data BLC. After a predetermined time duration, the count value of the U/D counter 128 converges to a value which causes the average frequency data Nc to agree with the magnification data MG, and the count value of the U/D counter 132 converges to a value which causes the left-right frequency difference data Nb–Na to agree with the magnification balance data BLC. In addition, since feedback control is provided, even if the relationship between the frequencies of the input voltage and output signal in the VCO 92 changes due to variations in the ambient temperature, supply voltage, or the like, the count values of the U/D counters 128 and 132 converge to certain values such that the average frequency data Nc agrees with the magnification data MG and such that the left-right frequency difference data Nb–Na agrees with the magnification balance data BLC.

In addition, the average frequency Fc of the video pixel clock VCK*2 in the image region when the count values of the U/D icounters 128 and 132 have converged becomes a value which is determined by the magnification data MG, as is also apparent from the following formula:

Fc=magnification data $MG/(t_{PLSA} \times 5)$

In the above formula, $t_{PLSA}$ denotes the length of the period when the pulse count signal PLSA is active, and since the number of pulses of the synchronizing pixel clock SYNCK is counted by the five counters 110A to 110E, respectively, $t_{PLSA}$ is multiplied by "5." If it is assumed that the length of the period when the pulse count signal PLSA is active is 273.8 ms, the above formula can be rewritten as:

Fc [MHz]=magnification data MG/1369

Similarly, with respect to the average frequency Fa of the video pixel clock VCK*2 in the SOS-side partial image region, the frequency Fs at the time of starting the scanning of the image region, the average frequency Fb in the EOS-side partial image region, and the frequency Fe at the time of ending the scanning of the image region (see FIG. 7) at the time when the count values of the U/D counters 128 and 132 have converged, these frequencies also assume values which are determined by the magnification data MG and the magnification balance data BLC, as shown below.

Fa [MHz]=(magnification data MG−magnification balance data BLC)/1369

Fs [MHz]=(magnification data MG−2×magnification balance data BLC)/1369

Fb [MHz]=(magnification data MG+magnification balance data BLC)/1369

Fe [MHz]=(magnification data MG+2×magnification balance data BLC)/1369         (1)

Thus, the VCO 92, the DAC 94, the SOS synchronizing circuit 96, the frequency detecting circuit 108, the average-frequency control circuit 122, the left-right frequency difference control circuit 124, and the adder 138 correspond to the frequency controlling means of the present invention (more specifically, they correspond to the frequency controlling means stated in aspect 7, and the VCO 92 corresponds to the oscillator stated in aspect 7).

Figure 8:
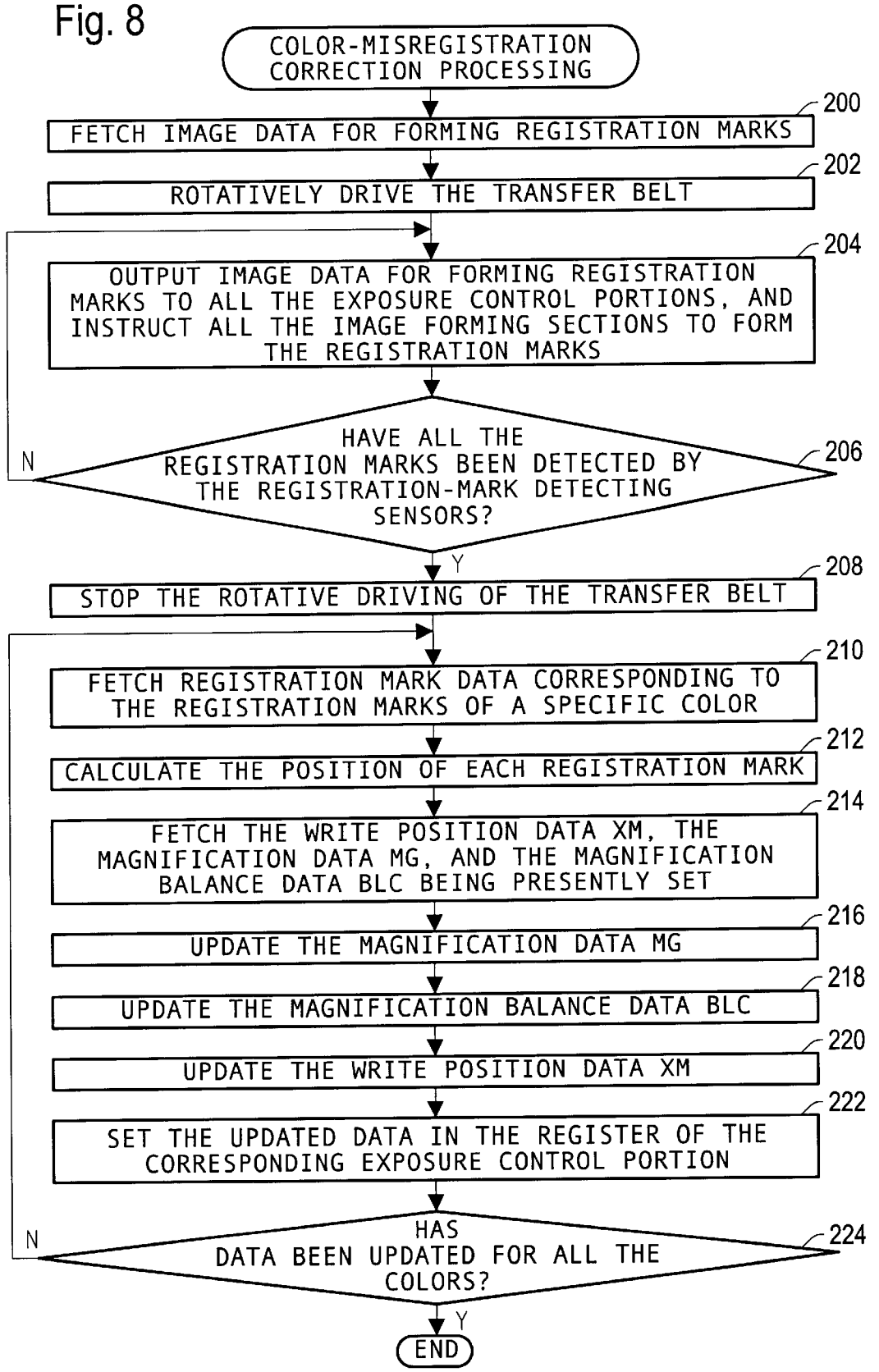
FIG. 8 is a flowchart illustrating the contents of color-misregistration correction processing in accordance with this embodiment.

Next, as the operation in this embodiment, a description will be given of color-misregistration correction processing executed by the CPU 64 of the control unit 16 with reference to the flowchart in FIG. 8. It should be noted that this color-misregistration correction processing may be effected periodically (e.g., once every day, every several days, or every several weeks, or every several hours), or the temperature inside the apparatus may be detected by a temperature sensor and this color-misregistration correction processing maybe effected when the detected temperature has undergone a large change. Alternatively, when the temperature inside the image forming apparatus 10 in the operating state is substantially fixed, this color-misregistration correction processing may be effected after waiting until the temperature inside the apparatus rises to the temperature in the operating state only when the apparatus has been installed or the place of its installation has been changed.

In Step 200, image data for forming registration marks is fetched from the ROM. In this embodiment, as also shown in FIG. 2, image data for allowing linear registration marks of a one-dot width extending along the vertical scanning direction to be formed at the starting end (SOS), the center (COS: center of scan), and the terminating end (EOS) of the image region along the horizontal scanning direction is stored in advance in the ROM as the image data for forming registration marks. In Step 200, this image data is fetched. Incidentally, if it is assumed that the recording density of the image is 600 spi, and that the transfer material 26 is A3 size, the starting end of the image region is at the first dot along the horizontal scanning direction in the image data, the center of the image region is at the 3508th dot, and the terminating end of the image region is at the 7016th dot.

In Step 202, the transfer belt 24 is rotatively driven by the rotatively driving unit 40. In an ensuring Step 204, the image data for forming registration marks is outputted to all the exposure control portions 70A to 70D respectively (this image data is stored in the image memory 72), and instructions are given to the respective image forming sections 12A to 12D to form the registration marks.

As a result, in the exposure control portion 70D corresponding to the image forming section 12D, the frequency of the video pixel clock VCK*2 (and the video pixcel clock VCK) is controlled on the basis of the magnification data MG set in the magnification setting register 76 and the magnification balance data BLC set in the magnification-balance setting register 78, and the line synchronizing signal LSYNC is generated on the basis of the write position data XM set in the writing-position setting register 74. Then, the image data for forming registration marks, which is stored in the image memory 72, is read at a timing synchronized with the video pixel clock VCK during the period when the line synchronizing signal LSYNC is active so as to generate a modulating signal, and the LD 44 of the light-beam scanning device 18 is driven through the LD driver 88.

In the image forming section 12D, the laser beam emitted from the LD 44 of the light-beam scanning device 18 is applied to the peripheral surface of the photoconductor drum 20 charged by the charger 36, and the laser beam is made to scan the peripheral surface, thereby forming electrostatic latent images of the registration marks on the peripheral surface. These electrostatic latent images are developed as toner images of cyan (C) by the developer 22, and these toner images of cyan (C) are transferred onto the transfer belt 24.

In addition, processing similar to that described above is effected also in the image forming sections 12A to 12C and in the exposure control portions 70A to 70C corresponding to these image forming sections. As a result, as shown in FIG. 2, registration marks in the respective colors (K, Y, M, an C) are formed at locations corresponding to SOS, COS, and EOS on the transfer belt 24 at positions misregistration from each other in the moving direction of the transfer belt 24. Thus, Step 204 corresponds to the mark-formation controlling means stated in aspect 3.

It should be noted that, in FIG. 2, registration marks in an X color formed at locations corresponding to SOS, COS, and EOS are respectively designated as "$X_{SOS}$," "$X_{COS}$," and "$X_{EOS}$." In addition, hereafter, the registration mark formed at the location corresponding to SOS will be referred to as the "SOS registration mark," the registration mark formed at the location corresponding to COS will be referred to as the "COS registration mark," and the registration mark formed at the location corresponding to EOS will be referred to as the "EOS registration mark." FIG. 2 shows, by way of example, a case in which the positions where the SOS registration marks, the COS registration marks, and the EOS registration marks in the respective colors are formed are misregistration in the widthwise direction of the transfer belt, i.e., in the horizontal scanning direction of the laser beam, due to such causes as tolerances of optical components which make up the light-beam scanning device 18, tolerances of their mounting positions, tolerances of a frame (not shown) on which the light-beam scanning device 18 is mounted, and changes and changes over time in the surrounding environment such as the temperature and the state of installation.

In Step 206, the registration mark data inputted from the registration-mark detecting sensor 28 through the amplifier 66 and the ADC 68 is consecutively stored in the RAM, a determination is made as to whether or not all the registration marks formed respectively on the transfer belt 24 by the image forming sections 12A to 12D have been detected by the registration-mark detecting sensor 28 on the basis of the inputted registration mark data, and the operation waits until YES is given in the determination. If YES is given, the operation proceeds to Step 208 to stop the rotative driving of the transfer belt 24 by the rotatively driving unit 40.

In an ensuring Step 210 and thereafter, the write position data XM, the magnification data MG, and the magnification balance data BLC which are used for the formation of an image in a predetermined color (e.g., "C") are updated. That is, in Step 210, of the registration mark data stored in the RAM, only the registration mark data corresponding to the registration marks of a specific color is fetched.

In Step 212, the positions of the respective registration marks are calculated on the basis of the fetched registration mark data. In this embodiment, as shown in correspondence with the registration marks as "ACTUALLY MEASURED POSITIONS OF REGISTRATION MARKS" in FIG. 9, the following are used as data representing the positions of the registration marks: the distance A old between the SOS registration mark and the EOS registration mark, the distance Bold between the SOS registration mark and the COS registration mark, and the distance X old between a position spaced apart a distance corresponding to one half of A old from the SOS registration mark and the COS registration-mark detecting sensor 28B. In Step 212, these items of data are calculated. In Step 214, the write position data XM, the magnification data MG, and the magnification balance data BLC which are presently set in the registers 74 to 78 (i.e., used at the time of formation of registration marks) are fetched as write position data XM old at the time of registration mark formation, the magnification data M Gold at the time of registration mark formation, and the magnification balance data BL Cold at the time of registration mark formation.

In an ensuing Step 216, the magnification data MG is updated such that the distance between the SOS registration mark and the EOS registration mark, i.e., the length of the image region, agrees with the distance TgtA between the SOS registration-mark detecting sensor 28A and the EOS registration-mark detecting sensor 28C. Namely, (length of the image region)∝1/(average frequency of the video pixcel clock in the image region)

Since the average frequency of the video pixel clock changes in inverse proportion to the magnification data, the following relationship holds:

(target value TgtA of the length of the image region)×(magnification data MGnew after updating)=(actually measured value Aold of the length of the image region)×(magnification data MGold at the time of registration mark formation)

Therefore, the updated magnification data MGnew after updating becomes:

MGnew=MGold×Aold/TgtA     (2)

In Step 216, the magnification data MG is updated by calculating Formula (2) above. By using the magnification data MGnew after updating as the magnification data MG, the distance between the SOS registration mark and the EOS registration mark can be made to agree with the distance TgtA between the SOS registration-mark detecting sensor 28A and the EOS registration-mark detecting sensor 28C, as shown in "VIRTUAL POSITIONS OF REGISTRATION MARKS AFTER ADJUSTMENT OF MAGNIFICATION" in FIG. 9. Incidentally, Step 216 together with Step 222, which will be described later, corresponds to the second designating means stated in aspect 2.

In Step 218, the magnification balance data BLC is updated such that the COS registration mark comes to be located at the center between the SOS registration mark and the EOS registration mark, i.e., such that the distance from the SOS registration mark (or the EOS registration mark) to the COS registration mark agrees with the distance TgtA/2 (=TgtB) between the SOS registration-mark detecting sensor 28A (or the EQS registration-mark detecting sensor 28C) and the COS registration-mark detecting sensor 28B.

The amount of movement of the position of the COS registration mark at the time when the value of the magnification balance data BLC is changed is dependent on the value of the magnification data MG. At a time when the value of the magnification balance data BLC is changed by "1," the amount of change in the position of the COS registration mark using the position of the SOS registration mark as a reference can be expressed as:

amount of change in position [mm]=length of the image region [mm]/(2·magnification data MG)

Figure 9:
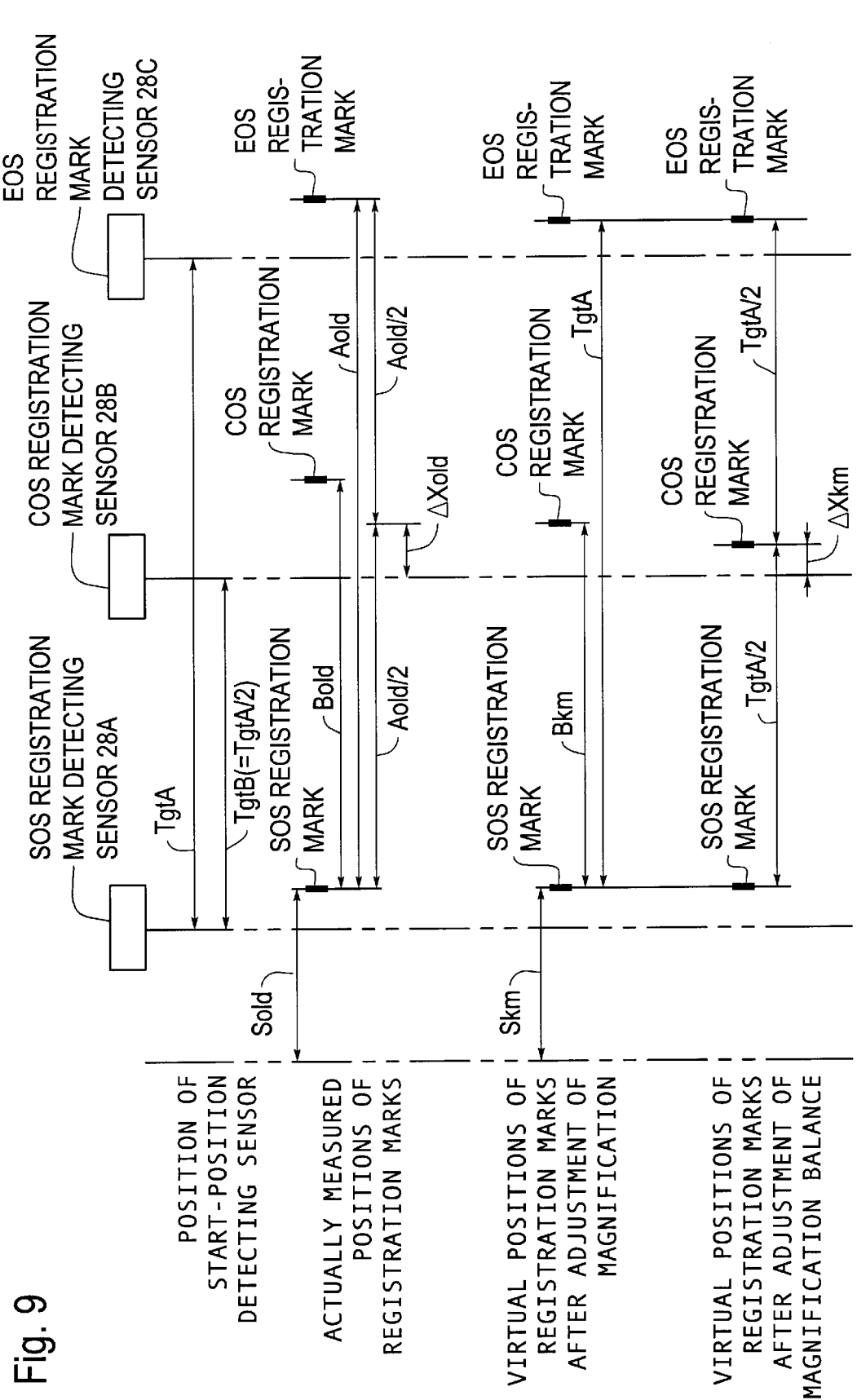
FIG. 9 is a conceptual diagram for explaining the calculation of magnification data, magnification balance data, and write position data.

If the magnification data MGnew after updating is used as the magnification data MG, the distance from the SOS registration mark to the COS registration mark changes from Bold to Bkm, as shown in "VIRTUAL POSITIONS OF REGISTRATION MARKS AFTER ADJUSTMENT OF MAGNIFICATION" in FIG. 9. For this reason, the amount of correction (amount to be corrected) of the position of the COS registration mark based on the magnification balance data BLCnew after updating becomes:

amount of correction [mm]=TgtB−Bkm=TgtB−Bold/A old·TgtA

Accordingly, the magnification balance data BLCnew after updating becomes:
[formula 1]

BLCnew=2(TgtB−Bold/Aold·TgtA) MGnew length of image region [μm]+MGnew·BLCold MGold     (3)

In Step 218, the magnification balance data BLC is updated by calculating Formula (3) above. This Step 218 together with Step 222, which will be described later, corresponds to the third designating means stated in aspect 2. It should be noted that the first term in Formula (3) above represents the amount of change in the value of the magnification balance data BLC for correcting the position of the COS registration mark by the aforementioned amount of correction. In Formula (3), the magnification balance data BLCnew after updating is determined by adding this first term to the second term for correcting the magnification balance data BLCold before updating in correspondence with the change in magnification accompanying the updating of the magnification data MG.

By using the magnification data MGnew as the magnification data MG and by using the magnification balance data BLCnew after updating and the magnification balance data BLC, the COS registration mark can be located at the center between the SOS registration mark and the EOS registration mark, and the distance between the SOS registration mark and the COS registration mark and the distance between the COS registration mark and the EOS registration mark can be made to agree with the distance TgtB (=TgtA/2) between the SOS registration mark detecting sensor 28A (or the EOS registration-mark detecting sensor 28C) and the COS registration-mark detecting sensor 28C, as shown in "VIRTUAL POSITIONS OF REGISTRATION MARKS AFTER ADJUSTMENT OF MAGNIFICATION BALANCE" in FIG. 9.

In an ensuing Step 220, the write position data XM is updated such that the registration marks of SOS, COS, and EOS respectively coincide with the positions of the registration-mark detecting sensors 28A to 28B. Namely, the timing of image writing is provided by comparing the count value of the number of pulses of the video pixel clock VCK*2 whose counting is started at the rise of the start position signal SOS' with the number of pulses represented by the write position data. Since the frequency of the video pixel clock VCK*2 during the counting of the number of pulses is equal to the frequency Fs of the video pixel clock VCK*2 at the time of starting the scan of the image region, the frequency of the video pixel clock VCK*2 during the counting of the number of pulses at the time when the formation of the registration marks is effected can be written from Formula (1) above as:

$$\text{Fold [MHz]}=(\text{MGold}-2\times\text{BLCold})/1369 \quad (4)$$

Similarly, the frequency of the video pixel clock VCK*2 during the counting of the number of pulses when the magnification data MGnew and the magnification balance data BLCnew after updating are used can be written as:

$$\text{Fnew [MHz]}=(\text{MGnew}-2\cdot\text{BLCnew})/1369 \quad (5)$$

Incidentally, in order to set to zero the displacement ΔXkm (see "VIRTUAL POSITIONS OF REGISTRATION MARKS AFTER ADJUSTMENT OF MAGNIFICATION BALANCE" shown in FIG. 9) of the position of the registration mark with respect to the position of the registration-mark detecting sensor when the magnification data MGnew and the magnification balance data BLCnew after updating are used, it suffices if the write position data XM is determined so as to satisfy the following Formula (6).

$$\Delta Xkm=2\cdot(XMnew-XMold)\cdot Ss/Fnew \quad (6)$$

It should be noted that XMnew is the write position data after updating. In addition, Ss is the scanning speed of the later beam on the photoconductor drum 20, and if, for example, it is assumed that the recording density of the image is 600 spi, that the process speed (the peripheral speed of the photoconductor drum 20) is 263.89 mm/s, and that the length of the optical scanning range of the laser beam on the photoconductor drum 20 is 348 mm, the scanning speed Ss becomes SS=1084.6 [mm/ms]. Meanwhile, ΔXkm can be geometrically expressed by the following Formula (7):

$$\Delta Xkm=\Delta Xold-(Aold-TgtA)/2-(Skm-Sold) = \Delta Xold-(Aold-TgtA)/2+2\cdot XMold\cdot Ss\cdot(1/Fold-1/Fnew) \quad (7)$$

Accordingly, from Formulae (6) and (7), the write position data XMnew after updating can be determined by the following Formula (8):

$$XMnew=(Aold-TgtA-2\cdot\Delta Xold)/(4\times Ss)+XMold\cdot(Fnew/Fold) \quad (8)$$

In Step 222, after determining Fold and Fnew in accordance with Formulae (4) and (5), the result of calculation is substituted into Formula (8) above, thereby updating the write position data XM. This Step 220 together with an ensuing Step 22 corresponds to the first designating means stated in aspect 2.

In the ensuing Step 222, the write position data XMnew after updating, the magnification data MGnew after updating, and the magnification balance data BLCnew after updating are set in the writing-position setting register 74, the magnification setting register 76, and the magnification-balance setting register 78 of the exposure control portion 70 corresponding to a predetermined color.

After the aforementioned data is set, the frequencies of the video pixel clocks VCK*2 and VCK are controlled in accordance with the data after updating, and the image writing position (writing timing) is controlled, so that if registration marks of a predetermined color are formed, the positions where the respective registration marks of SOS, COS, and EOS are formed agree with the positions of the registration-mark detecting sensors 28A to 28C, respectively. Then, in the usual formation of a color image, it is possible to overcome the occurrence of a displacement in the recording magnification of the overall image, a partial variation in the recording magnification of the image, and a positional misregistration in the image writing position with respect to an image of a predetermined color (e.g., the "C image").

In the ensuing Step 224, a determination is made as to whether or not the updating of the magnification data MG, the magnification balance data BLC, and the write position data XM mentioned above has been effected with all the colors. If NO is the answer in the determination, the operation returns to Step 210 to repeat the processing of Steps 210 to 222 with respect to an unprocessed color (e.g., "M," "Y," or "K"). If the processing of Steps 210 to 222 is effected for all the colors, YES is given as the answer in the determination in Step 224, and color-misregistration correction processing ends. Through this color-misregistration correction processing, it is possible to overcome the color misregistration in the formation of a color image.

It should be noted that although, in the above, the phase selection circuit 98 generates eight kinds of video pixel clocks VCK*2 whose phases are misregistration from each other on the basis of the line synchronizing signal LSYNC, the present invention is not limited to the same, and a plurality of kinds of start position signals whose phases are mutually different may be generated from the start position signal SOS outputted from the start-position detecting sensor 60 or the start position signal SOS' outputted from the timing control circuit 104, and one of the signals may be selected on the basis of the write position data XM.

In addition, although, in the above, designation and control of the magnification balance are effected by using the difference between the pixel clock frequency in the SOS-side partial image region and the pixcel clock frequency in the EOS-side partial image region, the ratio between the two frequencies may be alternatively used. Namely, in the above, a value corresponding to the left-right frequency difference Fb−Fa of the video pixcel clock VCK*2 is set as the magnification balance data BLC, and feedback control is effected on the basis of the left-right frequency difference Fb−Fa; however, the designation of the magnification balance and feedback control may be effected by using Fa/Fb, Fa/Fc, Fb/Fc, and the like instead of it.

In addition, although the light-beam scanning device 18 of the over-field type in which a laser beam wider than the width of the reflecting surface of the polygon mirror 52 is made incident upon the polygon mirror 52 has been described above as the light-beam scanning device by way of example, the present invention is not limited to the same, and it is possible to use a light-beam scanning device of an under-field type in which a laser beam narrower than the width of the reflecting surface is made incident upon the polygon mirror.

Furthermore, although, in the above, a dual-spot laser diode having two light-emitting spots is used as the light source, and two lines along the horizontal scanning direction are simultaneously scanned and exposed by the two light beams, the present invention is not limited to the same, and one line at a time may be scanned and exposed by a single light beam by using a light source which emits one light beam, or three or more lines along the horizontal scanning direction may be simultaneously scanned and exposed by three or more light beams. Still alternatively, an LED or other light source may be used as the light source.

In addition, although, in the above, the CCD sensor is used as the registration-mark detecting sensor 28, the present invention is not limited to the same, and it is possible to use MOB sensors or the like which are disclosed in, for example, the Unexamined Japanese Patent Application Publication Nos. Hei 7-72698 and Hei 6-118735.

In addition, although a description has been given above of the example in which the registration marks are formed at three locations including the starting end (SOS), the center (COS), and the terminating end (EOS) of the image region, the present invention is not limited to the same, and the registration marks may be formed at positions misregistration from the aforementioned positions. As for the number of the registration marks, a greater number of registration marks may be formed.

Further, although, in the above, the registration-mark detecting sensor 28 is provided inside the image forming apparatus 10 to detect the positions of the registration marks formed on the transfer belt 24, the present invention is not limited to the same. For example, an arrangement may be provided such that the registration marks formed on the transfer belt 24 are transferred onto and fixed on the transfer material 26, and the transfer material 26 is set on a registration-mark position detecting jig having a detecting sensor such as a line sensor and formed separately from the color-image forming apparatus 10, so as to detect the positions of the registration marks. In this case, the write position data XM, the magnification data MG, and the magnification balance data BLC can be calculated by an information processing apparatus such as a personal computer on the basis of the result of detection of the registration-mark positions by the aforementioned jig, and the result of calculation can be inputted to the image forming apparatus.

In addition, although the color-image forming apparatus of the type in which the four image forming sections 12A to 12D each having the photoconductor drum 20 and the light-beam scanning device 18 are consecutively disposed has been described above by way of example, the present invention is not limited to the same, and the present invention may be applied to an image forming apparatus of a type which has a single photoconductor and a single light-beam scanning device and has a plurality of developing devices for developing an electrostatic latent image formed on the photoconductor in mutually different colors (e.g., C, M, Y, and K), and in which toner images in the respective colors are consecutively formed on the peripheral surface of the single photoconductor drum and are superposed on a transfer belt or a transfer material, thereby forming a color image on the transfer belt or the transfer material. Furthermore, the present invention is also applicable to an image forming apparatus in which a plurality of light sources are disposed around a single polygon mirror, light beams emitted from the light sources are respectively deflected by the single polygon mirror, the light beams are applied to one of a plurality of photoconductors provided, so as to form toner images in mutually different colors (an image forming apparatus having so-called spray paint ROS).

In addition, although the image forming apparatus for forming a color image has been described above by way of example, it goes without saying that the present invention is also applicable to an image forming apparatus for forming a monochromatic image.

As described above, in the present invention, the recording magnification of the overall image along a scanning direction of the light beam and the partial recording magnification of the image along the scanning direction are designated, and while the light beam is made to undergo one scanning, the pixcel clock frequency is changed with the scope of change corresponding to the designated partial recording magnification of the image by using as a reference a frequency corresponding to the designated recording magnification of the overall image; and the position of starting the recording of the image along the scanning direction of the light beam is designated, and the modulation of the light beam is controlled so that the recording of the image by the light beam is started from the designated recording starting position. Therefore, an outstanding advantage is offered in that it is possible to correct the misregistration of the image forming position without entailing the complication of the structure.

What is claimed is:

1. An image forming apparatus that forms an image on an object by causing the object to be scanned by a light beam modulated in correspondence with an image to be formed at a timing synchronized with a pixel clock, comprising:

a frequency controller that designates an overall recording magnification of the image along a scanning direction of the light beam and a partial recording magnification of the image along the scanning direction, and which, while the light beam is made to undergo a first scanning, changes a pixel clock frequency with a scope of change corresponding to the designated partial recording magnification by using as a reference a frequency corresponding to the overall recording magnification; and a modulation controller that designates a recording starting position of the image along the scanning direction of the light beam, and which controls the modulation of the light beam so that the recording of the image by the light beam is started from the designated recording starting position.

2. The image forming apparatus according to claim 1, further comprising:

a first designator that designates the recording starting position in which a misregistration in the recording starting position along the scanning direction of the laser beam is corrected;

a second designator that designates the overall recording magnification in which a misregistration in a length of an image region along the scanning direction is corrected; and a third designator that designates the partial recording magnification in which a partial variation in the recording magnification of the image along the scanning direction is corrected.

3. The image forming apparatus according to claim 2, further comprising:

a mark-formation controller that forms marks at more than three different positions along the scanning direction of the laser beam; and a mark-detector that detects the positions of the more than three marks formed by the mark-formation controlling means;

wherein the first designator, the second designator and the third designator respectively calculate the recording starting position, the overall recording magnification, and the partial recording magnification based on the more than three marks.

4. The image forming apparatus according to claim 1, further comprising:

designating an average pixel clock frequency as the overall recording magnification along the scanning direction of the laser beam during a period when the light beam scans the image region.

5. The image forming apparatus according to claim 1, further comprising:

designating a balance of the recording magnification in each partial image region as the partial recording magnification along the scanning direction of the laser beam at a time when the image region is divided into a pair of partial image regions at a center of the image region along the scanning direction of the laser beam.

6. The image forming apparatus according to claim 5, further comprising:

designating one of a frequency difference and a frequency ratio of the pixel clock as the balance of the recording magnification in the pair of partial image regions during the period when the light beam scans the pair of partial image regions, respectively.

7. The image forming apparatus according to claim 1, wherein the pixel clock is generated based on a signal outputted from an oscillator whose oscillation frequency is controllable, and wherein an oscillator frequency controller detects the pixel clock frequency during the scanning by the light beam, and controls the frequency of the signal outputted from said oscillator so that a detected pixel clock frequency changes with the scope of change corresponding to the partial recording magnification based on the frequency corresponding to the overall recording magnification.

8. An method for forming an image on an object, comprising:

designating an overall recording magnification of the image along a scanning direction of a light beam;

designating a partial recording magnification of the image along the scanning direction;

changing a pixel clock frequency with a scope of change corresponding to the partial recording magnification based on a reference frequency corresponding to the overall recording magnification while the light beam is made to undergo a first scanning;

designating a starting position of the image along the scanning direction of the light beam; and modulating the light beam so that the recording of the image by the light beam is started from the designated recording starting position.

9. The method according to claim 9, further comprising:

first correcting a misregistration of the recording position of the image along the scanning direction of the laser beam based on the starting position;

second correcting a misregistration in a length of an image region along the scanning direction based on the overall recording magnification; and third correcting a partial variation in the overall recording magnification along the scanning direction based on the partial recording magnification.

10. The method according to claim 9, further comprising:

forming marks at more than tree mutually different positions along the scanning direction of the laser beam; and detecting the positions of the more than three marks;

wherein the recording starting position, the overall recording magnification, and the partial recording magnification are based on the positions of the more than three marks.

11. The method according to claim 8, further comprising:

designating an average pixel clock frequency as the overall recording magnification along the scanning direction of the laser beam during a period when the light beam scans the image region.

12. The method according to claim 8, further comprising:

designating a balance of the recording magnification in each partial image region as the partial recording magnification along the scanning direction of the laser beam at a time when the image region is divided into a pair of partial image regions at a center of the image region along the scanning direction of the laser beam.

13. The method according to claim 12, further comprising:

designating one of a frequency difference and a frequency ratio of the pixel clock as the balance of the recording magnification in the pair of partial image regions during the period when the light beam scans the pair of partial image regions, respectively.

14. The method according to claim 8, further comprising:

detecting the pixel clock frequency during the scanning by the light beam; and controlling the frequency of the oscillator signal to change the detected pixel clock frequency based on the designated partial recording magnification and the overall recording magnification;

wherein the pixel clock is generated based on a signal outputted from an oscillator whose oscillation frequency is controllable.

* * * * *